INVENTORS
ROBERT K. SEDGWICK
BY ERIC F. DRECHSLER
Cyril M. Hajenski
ATTORNEY

INVENTORS
ROBERT K. SEDGWICK
BY ERIC F. DRECHSLER
Cyril M. Hajewski
ATTORNEY

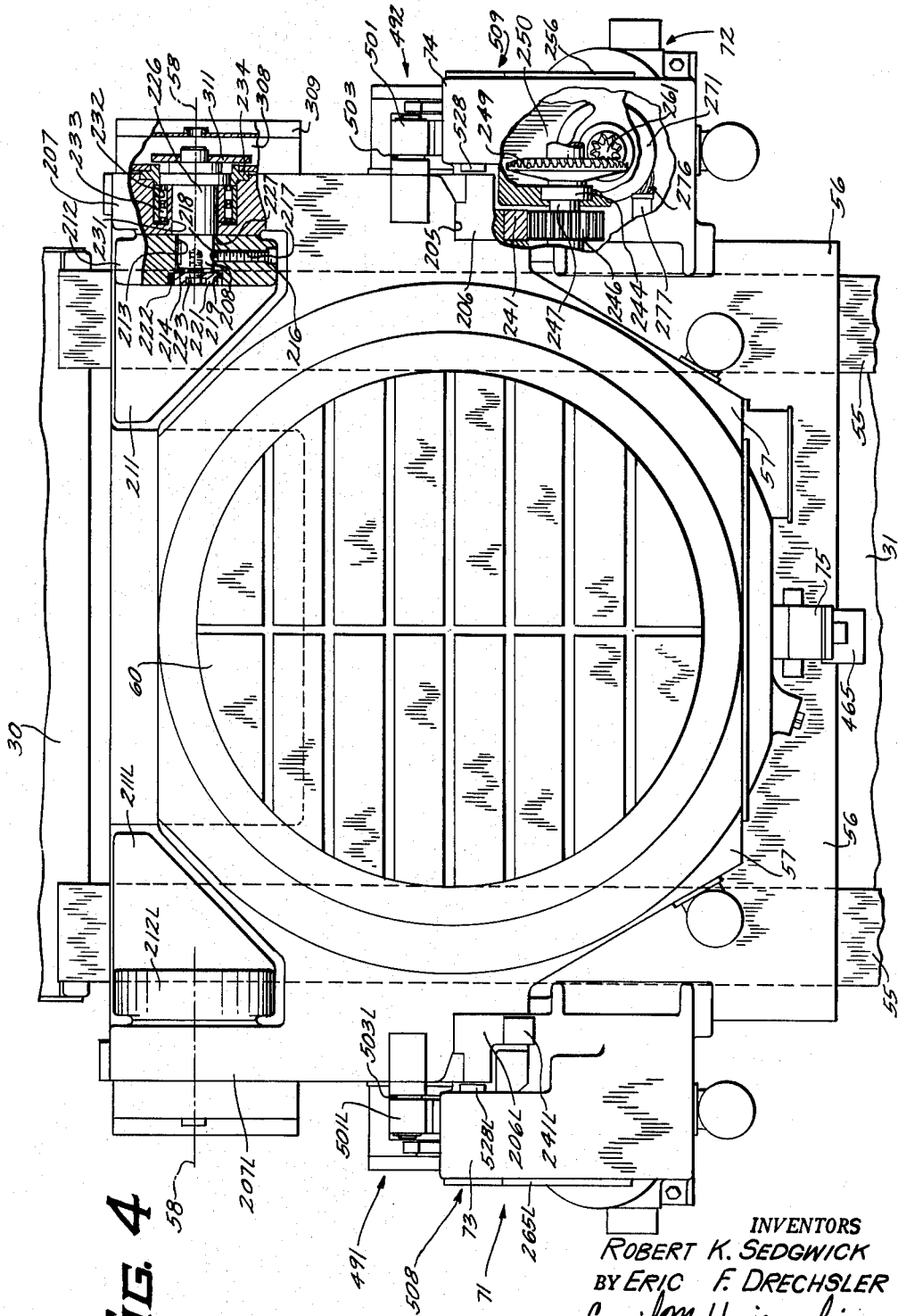

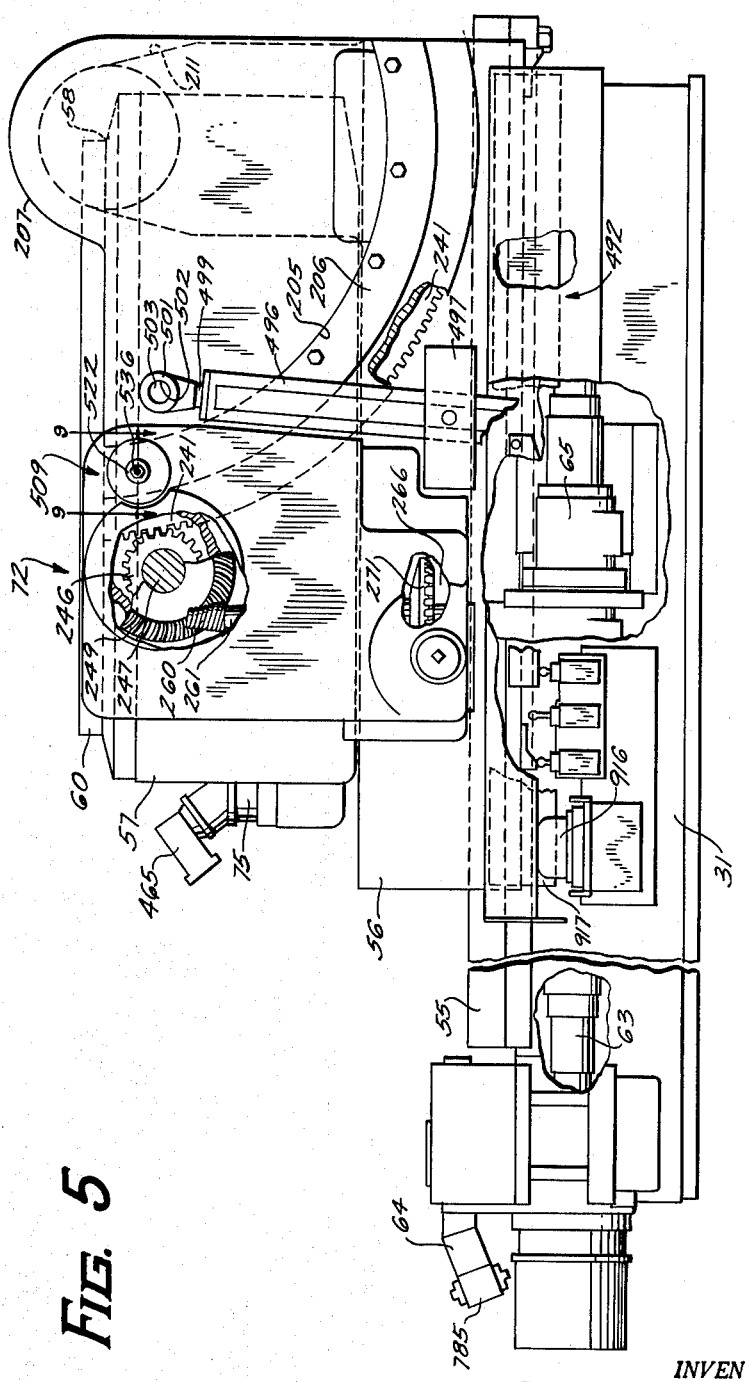

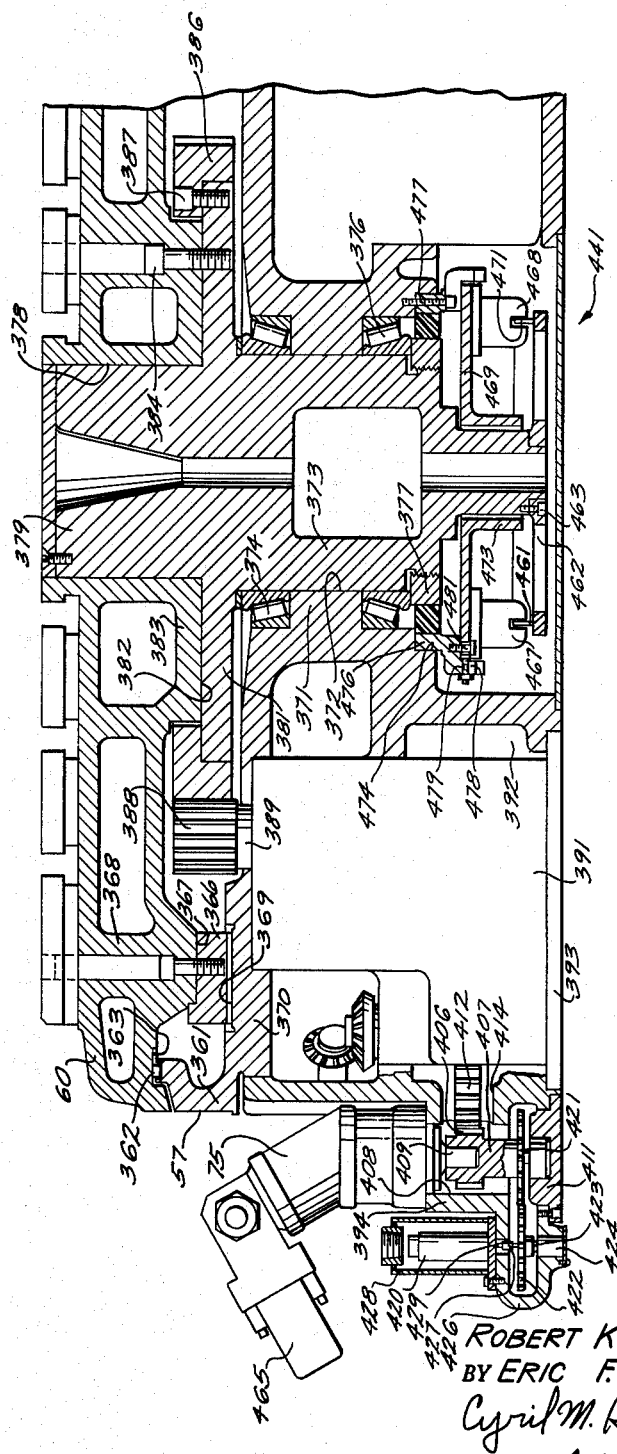

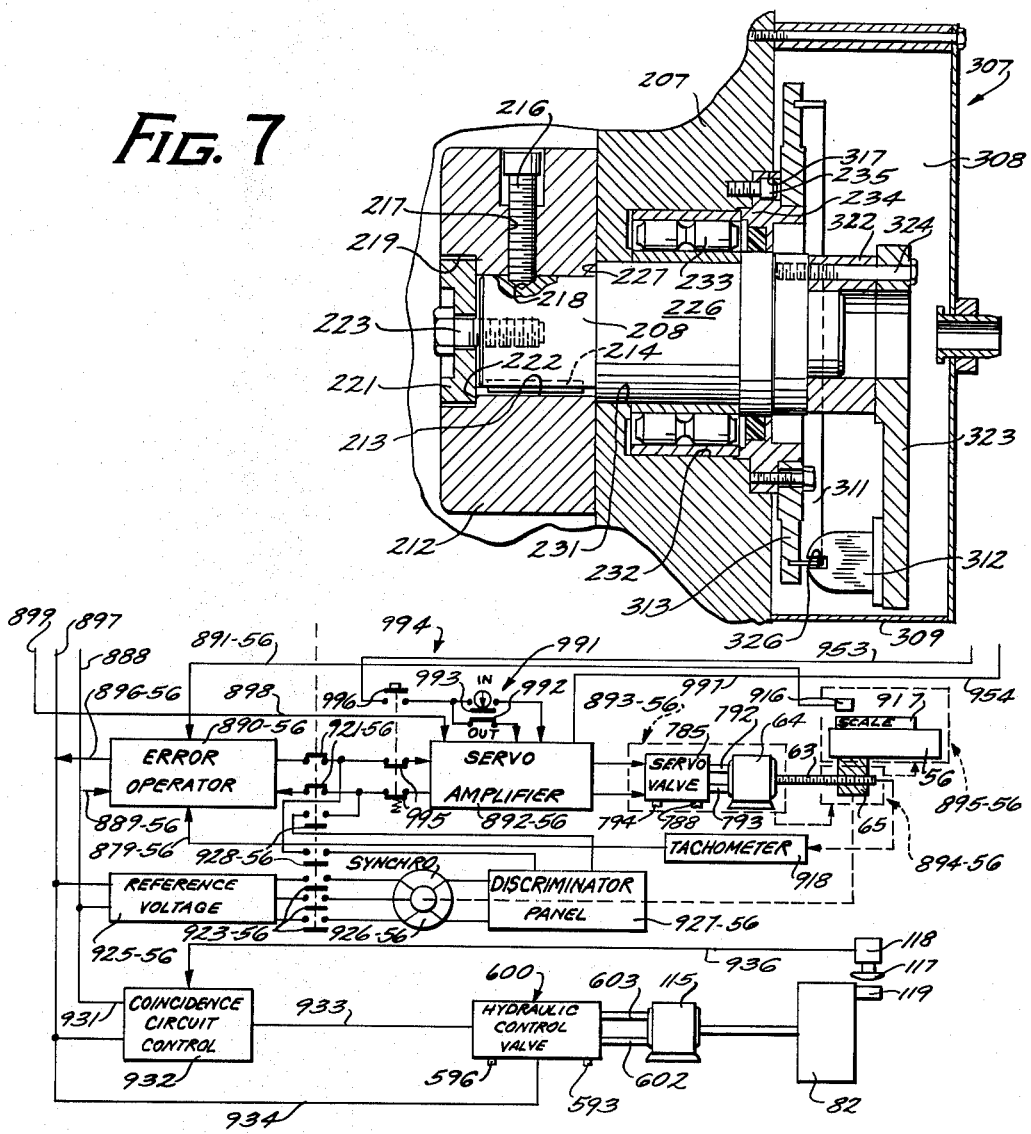

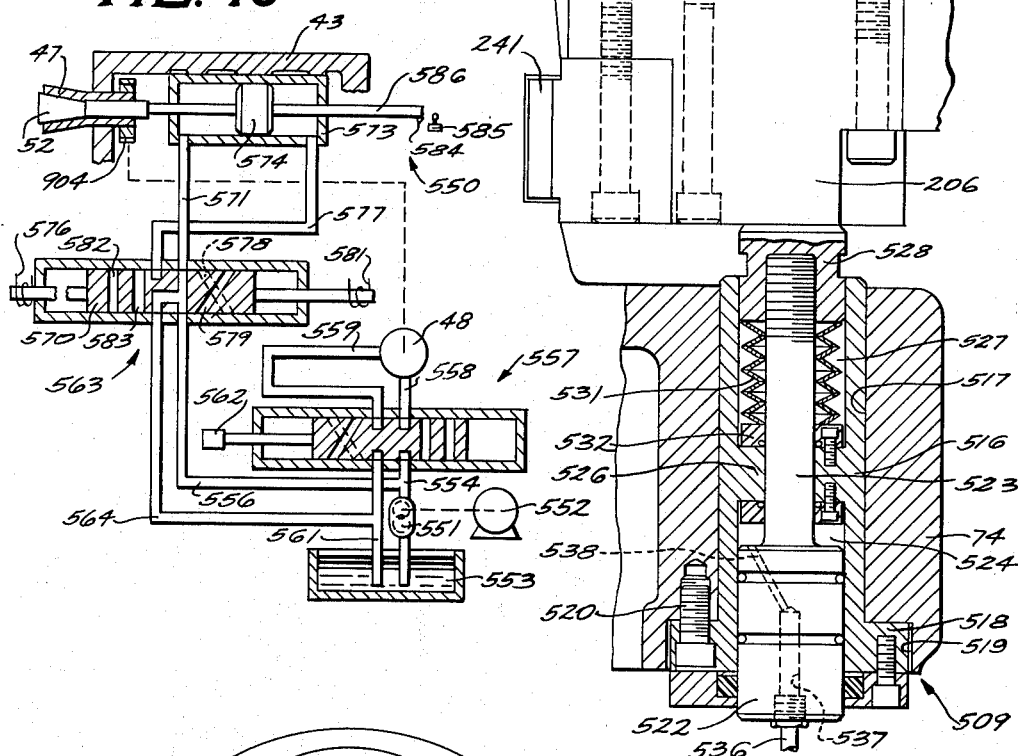
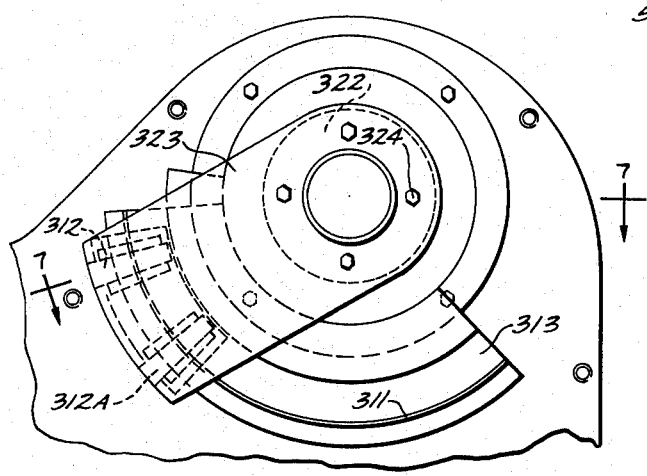

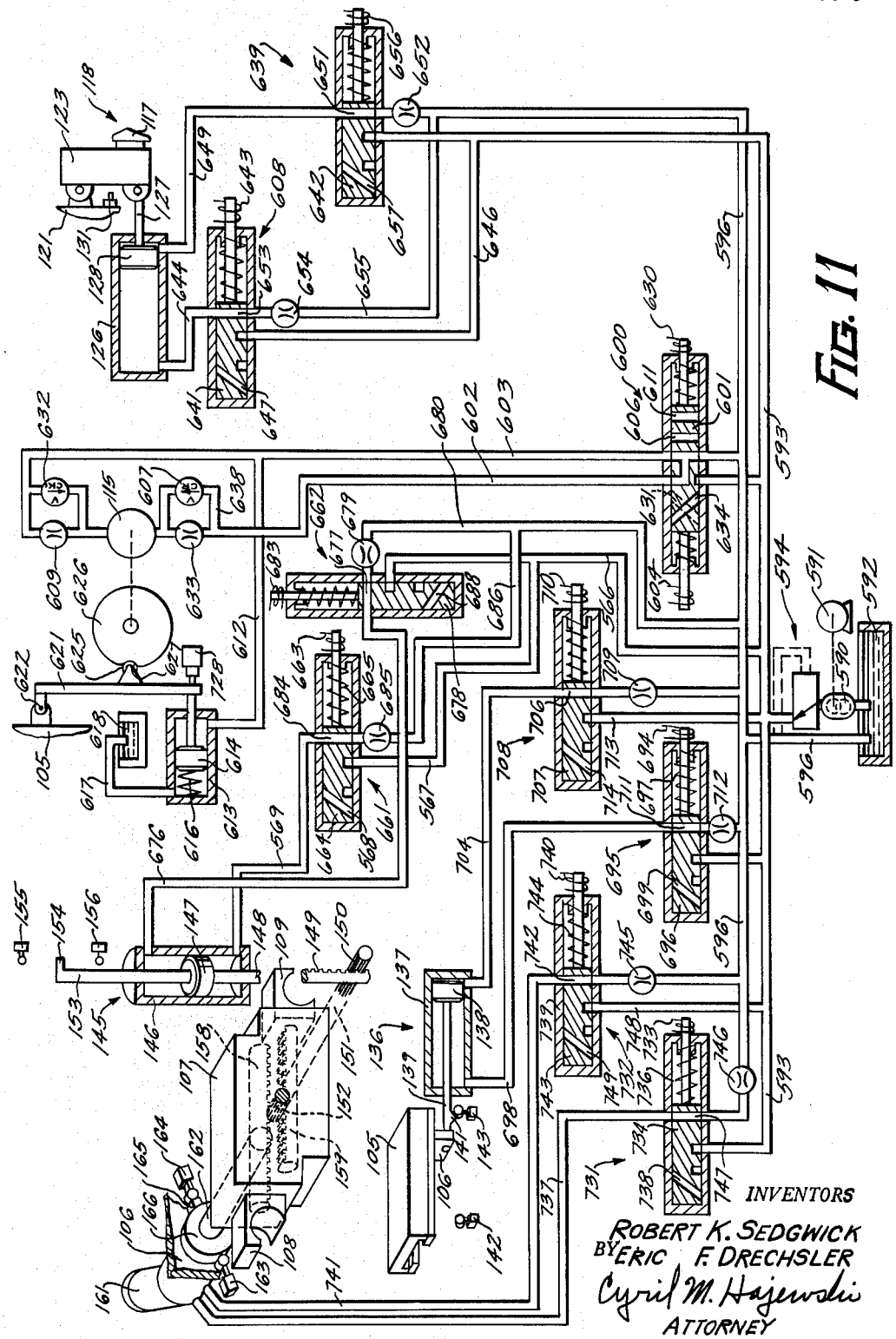

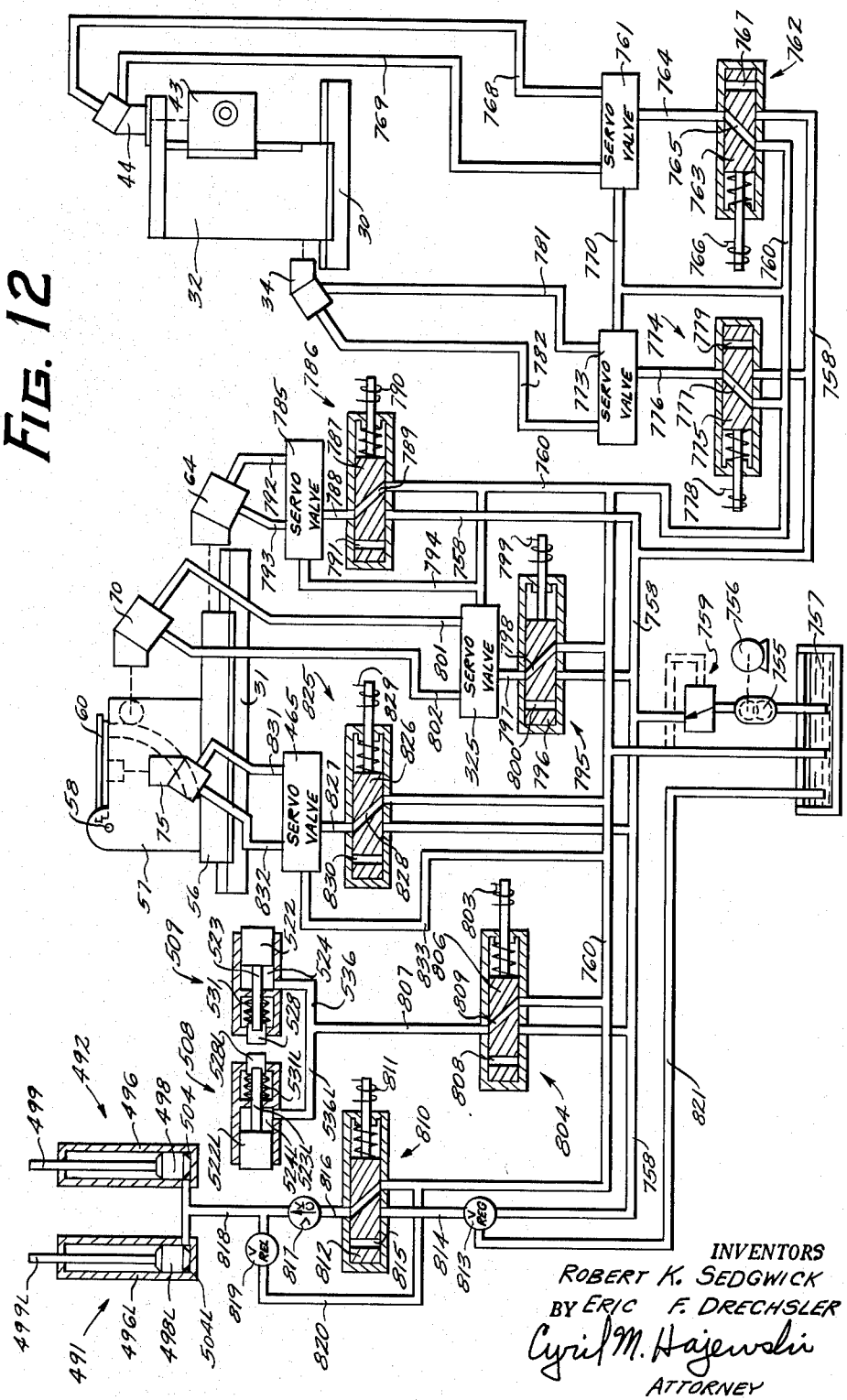

Nov. 23, 1965  R. K. SEDGWICK ETAL  3,218,933
MACHINE TOOL
Filed Nov. 13, 1961  12 Sheets-Sheet 12

INVENTORS
ROBERT K. SEDGWICK
BY ERIC F. DRECHSLER

Cyril M. Hajewski
ATTORNEY

United States Patent Office 3,218,933
Patented Nov. 23, 1965

3,218,933
MACHINE TOOL
Robert K. Sedgwick, Waukesha, and Eric F. Drechsler, Milwaukee, Wis., assignors to Kearney & Trecker Corporation, West Allis, Wis., a corporation of Wisconsin
Filed Nov. 13, 1961, Ser. No. 151,810
5 Claims. (Cl. 90—15)

This invention relates generally to machine tools, and, more particularly, to a machine tool having a plurality of members that are movable in five different paths of travel for positioning a work-piece and a cutting tool relative to each other for the performance of a machining operation.

Another object of this invention is to provide a machine tool with automatic tool change means and having its members movable along five different paths of movement which is especially well adapted to be operatively controlled from recorded data.

Still another object of this invention is to provide a machine tool having a rotatable cutting tool spindle movable along two mutually transverse paths and provided with a rotatable work supporting table which is bodily movable in a direction transverse to the axis about which it rotates and which is also bodily pivotable in a vertical plane so that the combined rotational and vertical movements of the work supporting table will operate to position a workpiece carried on the table in any desired angular position with respect to the axis of the tool carrying spindle.

According to this invention, an improved machine tool is provided with a power driven rotatable tool spindle and a plurality of cutting tools stored in proximity thereto together with means for interchanging a stored tool with a tool carried by the spindle. The improved machine tool is also provided with a power driven supporting column movable in a path of travel designated as the "X" axis. A power driven spindle supporting head is carried by the column and is movable thereon in a path of travel perpendicular to the "X" axis and designated as a "Y" axis. The combined movements of the column and the spindle supporting head operate to effect a positioning of the tool carrying spindle in any desired position along the "X" and "Y" axes. The machine tool is also provided with a power driven saddle mounted on a base independently of the column and movable in a path of travel, designated as the "Z" axis, which is transverse to both the "X" and "Y" axes.

A table base is mounted on the saddle for movement therewith along the "Z" axis. A work supporting table is carried by the table base for rotation about its own axis which constitutes a fourth axis of movement. The table is connected to be rotated by a power source through a suitable transmission, both of which are carried for movement with the table base.

In addition, the table base is pivotable in a vertical direction relative to its supporting saddle about a fifth axis of movement that is perpendicular to the axis of rotation of the table. As a result, since the rotary table is mounted on the table base it will move in an arcuate path with the base when the latter is pivoted about the fifth axis. Suitable clamping means are provided for securing the rotary table in any desired position along its arcuate path of travel about the fifth axis. Inasmuch as the power source and transmission for rotating the table about its axis are mounted on the base, they will move with it during its pivotal movement so that they remain operable to rotate the table in any of its pivotal positions about the fifth axis.

Accordingly, the spindle is movable relative to a workpiece on the table in two mutually transverse directions along the "X" and "Y" axes. In addition, a workpiece carried by the table is movable relative to the spindle rectilinearly along the "Z" axis as well as in rotational movements about the axis of rotation of the table and in an arcuate path about the pivotal axis of the table base. With this arrangement, a machine tool having five axes of movement is provided with exceptional rigidity and stability. Despite the many axes of movements, all of the movable members of the machine are well supported to avoid vibration and chatter under load, and to achieve improved accuracy in the machining operations.

The foregoing and other objects of the invention which will become more fully apparent from the following description of the machine tool herein illustrated may be achieved by the embodiments described herein and illustrated in the accompanying drawings, in which:

FIG. 4 is an enlarged detail plan view of the rotary table and table base with parts broken away to show the right side table base drive transmission and its associated table base sector gear rack, as well as the right side table base pivot connection;

FIG. 5 is an enlarged detail view in right side elevation of the base, and its associated elements with portions broken away to reveal the interior mechanism;

FIG. 6 is an enlarged fragmentary view in vertical section through the center of the rotary table and its supporting base;

FIG. 7 is an enlarged detail view partly in elevation and partly in vertical section taken along the plane represented by the line 7—7 to show the right side table base pivot connection assembly as well as the scale and reading device for effecting precise angular positioning of the table base;

FIG. 8 is an enlarged detail view of the right trunnion with cover removed showing the mounting of the reading head and its cooperating positioning scale;

FIG. 9 is an enlarged detail view in horizontal section through the right side table base clamp mechanism along the plane represented by the line 9—9 in FIG. 5;

FIG. 10 is a schematic diagram illustrating the hydraulic components and associated circuitry for the tool spindle motor and the collet clamp and release mechanism;

FIG. 11 is a schematic diagram illustrating the hydraulic circuit for effecting a tool change;

FIG. 12 is a schematic diagram illustrating the hydraulic circuit for actuating the movable members and their associated mechanisms;

FIGS. 14 and 14A are schematic block diagrams illustrating the control circuit for effecting automatic selective movement of the movable machine elements in response to tape input.

Figure 1:
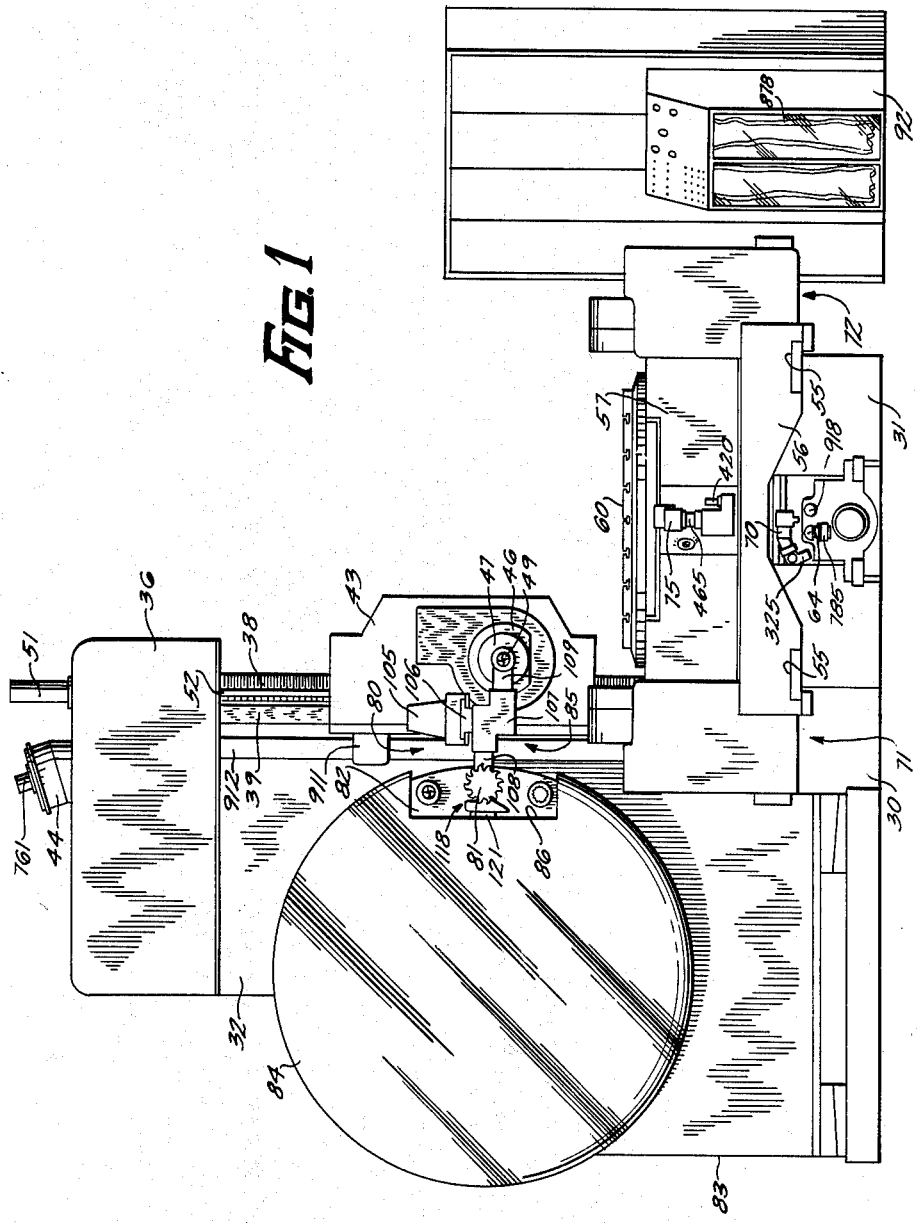
FIGURE 1 is a view in front elevation of a machine tool exemplifying the present invention and comprising a preferred embodiment of the invention.
Figure 2:
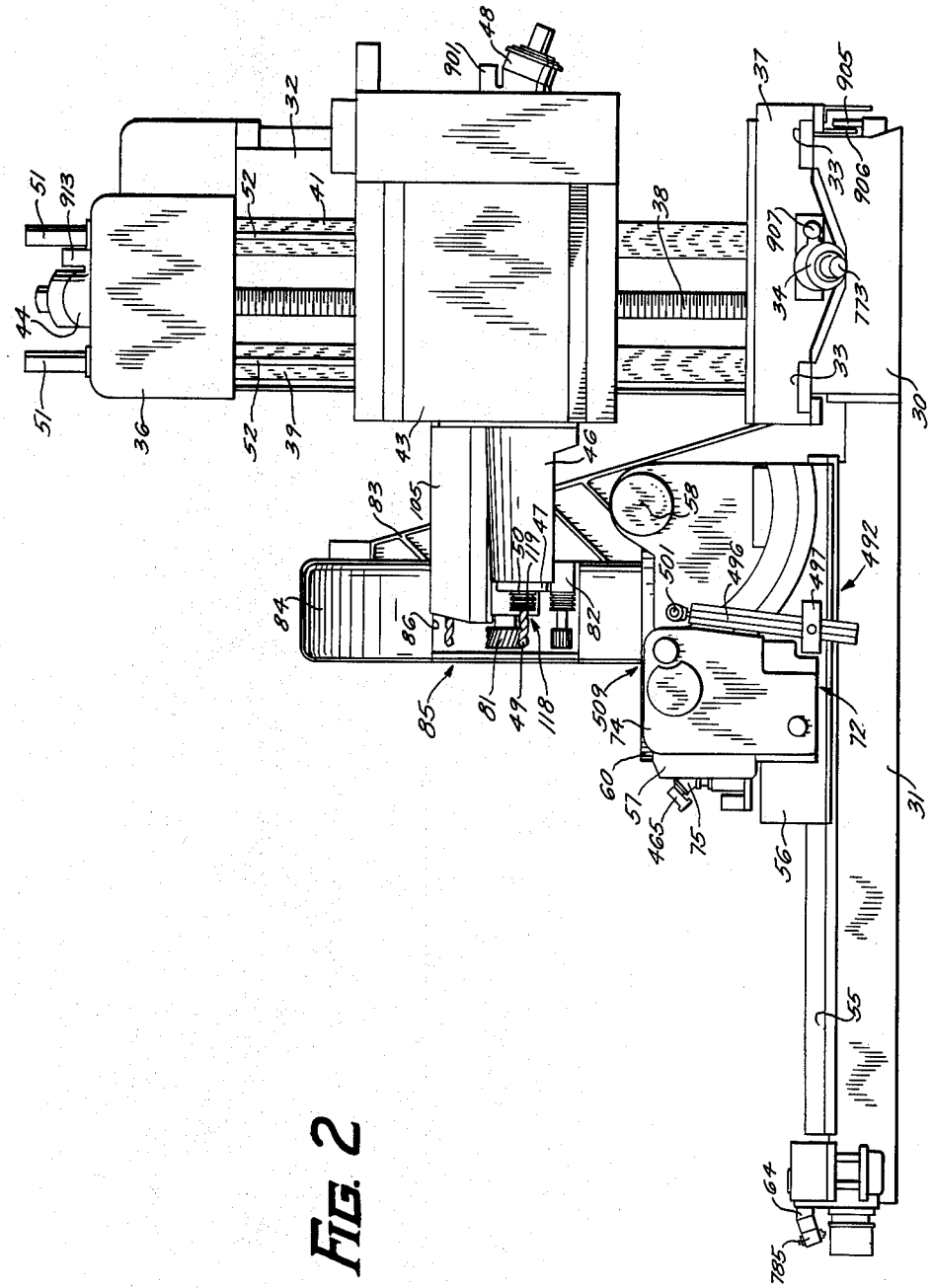
FIG. 2 is a view in right side elevation of the machine tool shown in FIG. 1.

Referring to the drawings, and particularly to FIGS. 1 and 2 thereof, the invention is incorporated in a horizontal spindle type machine provided with a longitudinally extending base 30 and a forwardly extending base section 31. A vertically upstanding column 32 is slidably carried by the base 30 on a pair of ways 33 for selective longitudinal movement in either direction along the "X" axis. Movement of the column 32 along the "X" axis is effected by means of a motor 34 which is connected to drive a horizontal screw [not shown] journaled in the base 30 and which is operably engaged by the usual translating nut [not shown], secured to the under surface of the column. The vertically upstanding column 32 is provided with lower and upper lateral extensions 36 and 37 that are respectively disposed to support the opposite ends of a rotatably journaled elevating screw 38. Vertically extending guideways 39 and 41 provided on the column 32, are respectively disposed to slidably engage cooperating guideways [not shown] presented by the inner side face of a vertically movable spindle head 43. The spindle head 43 is provided with the usual elevating screw nut [not shown] that is secured within the spindle head 43 in a manner to operatively engage the vertically journaled elevating screw 38. Power rotation of the elevating screw 38 is effected in either direction by means of an hydraulic motor 44 located on the top surface of the top lateral extension 36 and which is connected to rotate the elevating screw 38 by a transmission [not shown] contained within the top lateral extension 36.

The spindle head 43 together with a forwardly extending extension 46 secured thereto, rotatably supports a tool spindle 47 which extends rearwardly into the spindle head in a manner to be selectively driven by a transmission [not shown] contained within the spindle head 43 and which is connected to be driven by a motor 48 carried on the rear face of the spindle head 43, as shown in FIG. 2. As shown in FIGS. 1 and 2, a drill 49 is carried in a tool holder 50 and is operatively secured within the forward tool receiving end of the spindle 47 by means of a split collet 52, shown schematically in FIG. 10, that is selectively operable to effect a locking or release of the tool with the spindle. A pair of hydraulic pistons and cylinder mechanisms 51 are mounted on the top lateral extension 36 for connection to the spindle head 43 by connecting rods 52 and are arranged in a well known manner to counterbalance the weight of the spindle head 43 and its associated mechanism.

The forwardly extending base extension 31 is provided with horizontally disposed, spaced apart way surfaces 55 adapted to slidably support a saddle 56 for selective transverse movement relative to the base 30. It will be apparent that the tool spindle 47 is supported for vertical movement along the "Y" axis and for longitudinal movement along the "X" axis relative to the saddle 56 which, in turn, is transversely movable along the "Z" axis.

On its upper surface, the saddle 56 is disposed to support a table base 57 carried thereon for pivotable movement about an axis 58 which is disposed transversely of the axis of the spindle 47 and parallel to the "X" axis. The pivotal axis 58 of the table base 57 constitutes a fourth axis of machine movement. The saddle 56 is moved along the "Z" axis in either direction by means of a screw 63, shown in FIGS. 3 and 5, which is rotatably journaled in the forwardly extending base extension 31 and is rotated by power in either direction by means of a motor 64 located at the extreme forward end of the base extension 31. The saddle 56 is provided with a translating screw nut 65 which is secured to the under surface of the saddle and is operatively engaged with the translating screw 63 in the usual manner.

Figure 3:
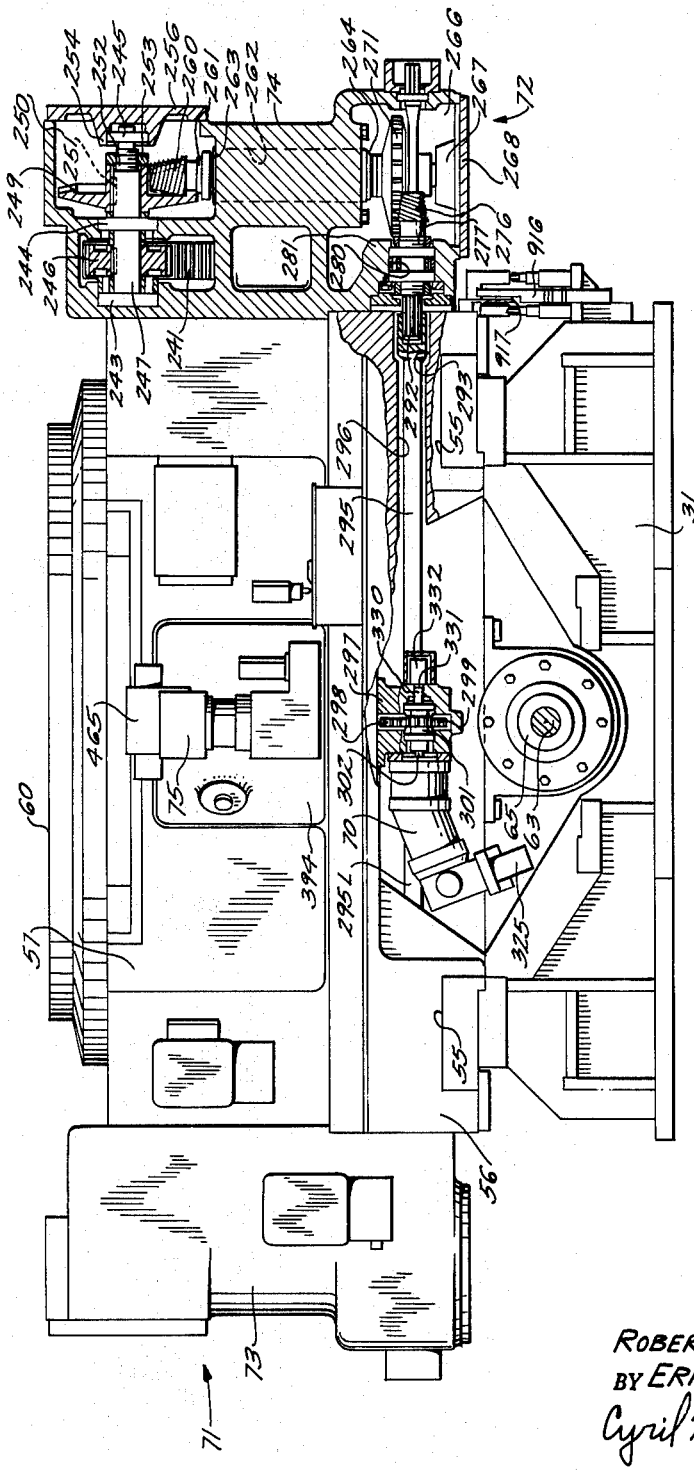
FIG. 3 is an enlarged detail view in front elevation illustrating the base, saddle, and table base of the machine tool depicted in FIG. 1 with parts broken away to show the table base right side drive transmission.

A motor 70 is provided for effecting power actuation of the table base in its bodily pivotal movement about the axis 58. As shown in FIG. 3, the motor 70 is secured to the underside of the saddle 56 and is connected to drive the table base through identical left and right transmissions 71 and 72. The transmissions 71 and 72 are disposed in transmission cases 73 and 74 secured to the left and right sides, respectively, of the saddle 56 and which are constructed and arranged to extend upwardly along the sides of the table base 57.

A work supporting table 60 is rotatably supported on the table base and is driven by a motor 75 carried on the front face of the table base 57. The motor 75 is connected to effect rotation of the table through a transmission contained within the table base 57 and connected to rotate the table 60 independently of the positioning movement of the table base. As the table base 57 is power driven in a tilting movement, the rotary table 60, as well as, its associated transmission and motor 75 will move with it so that the table 60 may be rotated relative to the table base regardless of the angular position of the table base.

It will be apparent that the tool spindle 47 is supported for vertical movement along a "Y" axis and for longitudinal movement along the "X" axis relative to the saddle 56 which is transversely movable along a "Z" axis. In addition, the rotary work supporting table 60 is rotatable about its own axis constituting the fifth axis of machine movement as well as being bodily positionable by pivotal movement of the table base 57 moving about the axis 58 constituting the fourth axis of machine movement. Thus, a workpiece [not shown] secured to the top surface of the rotary work supporting table 60 may be angularly positioned with respect to the axis of the tool spindle 47 in two mutually transverse planes while the spindle itself may be moved to a selected position along the "X" and "Y" axes, and the saddle 56 may be moved along the "Z" axis the required distance so that the spindle may perform the desired machining operation. The machine is capable of effecting one or any combination of machine movements as desired and necessary for any particular machining operation.

The machine tool depicted is adapted to receive different tools, as required, which tools may be automatically inserted in the tool receiving spindle 47 by a tool change mechanism 80 in a manner that a plurality of different machining operations may be performed with a minimum of time required for a tool changing function. This arrangement avoids the necessity for manually changing the tool since the tool change function, as well as, all other machine functions and movements, are under the control of a tape carrying a coded program of machine functions to be performed. Such control is effected through an electronic control system 91 responsive to a tape reader 885 contained within a cabinet 92, shown in FIG. 1.

As a prerequisite to effecting a tool change operation, the saddle 56 is moved outwardly along the "Z" axis away from the column 32 in a manner that a workpiece [not shown] carried by the rotary work supporting table 60 is retracted a sufficient distance to avoid interfering with the movement of the tool spindle 47. After this, the tool spindle 47 is moved from any preceding operating position, along the "X" and "Y" axes, to a predetermined tool change ready position adjacent to the tool change mechanism 80, shown in FIG. 1, into a position to receive a preselected tool, such as a milling cutter 81, carried by an indexable tool storage magazine 82 that is disposed at the opposite side of the tool change mechanism 80. Movement of the preselected tool into a tool change station 85 adjacent to the tool change mechanism 80 is affected by the appropriate indexable movement of a storage magazine 82 during the previous machining operation. Both the tool change mechanism 80 and the indexable storage magazine 82 are carried by a stationary supporting member 83 that is spaced apart from the longitudinally movable column 32. The tool storage magazine 82 is provided with a plurality of storage sockets adapted to carry a total of thirty different metal cutting tools. Thus, at the start of a tape control program of machine operations, there are a total of thirty-one tools available, including the tool already carried by the spindle 47, plus the thirty tools stored in the magazine. A hollow stationary, circular shield 84 is positioned to overlie the tools carried by the rotatable storage magazine 82. The stationary shield 84 is provided with a cutaway portion 86 at the tool change station 85 in a manner that one or another of the preselected tools may be advanced into the tool change station adjacent to the tool change mechanism 80.

The tool change mechanism 80, in general, comprises a forwardly extending support member 105 carried by the support 83 and having secured to its underside a pair of inwardly projecting guideways cooperating to provide a flanged support for receiving the flanged upper portion of a carriage 106. The carriage 106 is disposed to be guidably constrained to the underside of the support member 105 for selective reciprocal movement along an axis parallel to the axis of rotation of the tool spindle 47. As shown in FIG. 1, a tool change member 107 is pivotally secured to the reciprocal carriage 106 for selective axial bodily movement along the guideway of the supporting member 105. The tool change member 107 is a hollow housing structure, which is provided with a pair of oppositely extensible tool grips 108 and 109, that are selectively movable from a retracted position within the tool change housing into fully extended clamped engagement with tool holders respectively carried by the storage magazine 82 and the tool spindle 47. For a more detailed description of the magazine 82 and tool change mechanism 80 reference may be made to a copending patent application of Robert K. Sedgwick et al., Serial No. 50,495, filed August 18, 1960.

Indexable movement of the storage magazine 82 for effecting selective positioning of a desired tool at the tool change station 85 is effected by means of a motor 115, shown diagrammatically in FIG. 11. The indexing movement of the storage magazine 82 to position a preselected tool in the tool change ready station is controlled by coding provided on a collar 119 which is carried by each of the tool holders 50. Each collar 119 is provided with axially spaced annular grooves and rings, the number of grooves and rings, as well as their respective axial positions being different on each of the tool holders to provide a different binary code signal for each of the tool holders. These grooves and rings, carried by the collar 119, provide a binary code signal to actuate radially movable switch actuating fingers 117 carried by a retractable switch mechanism 118, as diagrammatically shown in FIG. 11. When the preselected tool is sensed by the switch mechanism 118 a signal is produced to terminate rotating movement of the magazine 82 for locating the preselected tool at the tool change station 85. The arrangement of the collar on the tool holders 50, as well as the switch mechanism 118 and its associated circuitry, are set forth in greater detail in the aforementioned copending application of Robert K. Sedgwick et al.

In the event the numerical control system provides an input signal calling for the milling cutter 81, subsequent rotational movement of the storage magazine 82 will position the tool 81 in the ready station and will be stopped upon engagement of the coded collar presented by the tool holder 50 with the switch actuating fingers 117. After this, the switch mechanism 118 is caused to be pivoted in a leftward direction, as viewed in FIGS. 1 and 11, to retract the radially movable switch fingers 117 from engagement with the coded collar 119. With the switch mechanism 118 retracted, the milling cutter 81 with its associated tool holder 50 is conditioned for automatic withdrawal from the storage stocket of the magazine in which the tool holder and cutter are stored, during a subsequent tool changing operation. The method and structure utilized to effect indexable advancement of the magazine for advancng a code identified tool in a tool change ready station is fully disclosed and discribed in a co-pending patent application of Brainard et al., entitled, Machine Tool With a Mechanical Cutting Tool Changer, Serial No. 744,976, filed June 27, 1958, which has matured into U.S. Patent 3,052,011.

To support the code actuated switch mechanism 118 relative to the rotating tools carried by the rotatable tool storage magazine 82, a stationary arm 121, FIG. 11, is secured to the forwardly extending end of a stationary shaft [not shown] on which the magazine 82 is journaled. As shown in FIG. 11, the housing 123 of the switch mechanism 118 is pivotally secured at its upper end to the arm 121 for retraction and extension into position to engage with the coded collar of the tools carried by the magazine 82. A switch retracting cylinder 126 is provided with a piston rod 127, adjustably secured at its outer end to the lower end of the housing 123. The piston rod 127 is secured to a reciprocal piston 128 supported within the cylinder 126 and, which, in turn, is movable to its extreme rightward limit of movement by fluid pressure. Rightward positioning of the piston 128 serves to maintain the fingers 117 in a position to be successfully engaged by the coding on the collars 119, respectively, presented by the various tool holders as they travel in a circular path relative to the switch mechanism 118. Upon arrival of a preselected tool at the tool change ready station, the cylinder mechanism 126 is actuated to effect a clockwise pivotal movement of the housing 123, thereby moving the switch fingers 117 to a retracted position relative to the coded collar presented by the preselected tool.

As the housing 123 of the switch mechanism 118 is pivoted in a clockwise direction for retracting the fingers, it will engage a limit switch 131 that is carried by a bracket [not shown] secured to the arm 121. As will hereinafter be more fully explained, the switch 131 is interconnected in the control circuit and constitutes a portion of the control for effecting a selected tool change.

In order that the carriage 106 may be advanced or retracted to effect bodily movement of the tool change member 107, for withdrawing tools from the magazine 82 and the spindle 47 or inserting them therein, a fluid actuator 136 is provided, as shown in FIG. 11. The fluid actuator 136 comprises a cylinder 137 in which is reciprocally supported a piston 138 having a piston rod 139 secured to it and extending outwardly of the cylinder with the free end being connected to the carriage 106. Thus, movement of the piston 138 in a leftward direction; as viewed in FIG. 11, operates to advance the carriage 106 relative to its support 105 and thereby moves the tool change member 107 for effecting the withdrawal of the tools engaged by the arms 108 and 109. On the other hand, the movement of the piston 138 rightwardly within the cylinder 137 will effect a retraction of the carriage and also of the tool change member 107. As the carriage is moved to a full advanced position, a dog 141 schematically shown as being attached to the piston rod 139 will actuate a limit switch 142. On the other hand, when the carriage 106 is fully retracted, the dog 141 will actuate a limit switch 143. As will hereinafter be more fully explained, the switches 142 and 143 are also interconnected in the control circuit and constitute a portion of the control for effecting a selected tool change.

As diagrammatically shown in FIG. 11, a fluid actuator 145 is provided for extending and retracting the tool gripping arms 108 and 109. The fluid actuator 145 comprises a piston 147 reciprocally supported within a cylinder 146, the piston being operably connected with the tool gripping arms 108 and 109 to effect their extension or retraction depending upon the direction of operation of the piston 147. Such connection of the piston 147 to the arms 108 and 109 may be effected in any well known manner, and as shown in FIG. 11, is operatively connected by means of a piston rod 148, the extreme outer end of which is provided with a rack portion 149. The rack 149, in turn, is in meshing engagement with a pinion 150 that is formed on the extreme outer end of a shaft 151 rotatably journaled in the tool change member 107. The opposite end of the shaft 151 is provided with a pinion 152 that is disposed to mesh with racks 158 and 159 that are attached to the inner end of the arms 108 and 109, respectively. A switch actuating rod 153 is secured to the opposite side of the piston 147 and extends outwardly of the cylinder opposite the piston rod 148. The rod 153 is provided with a dog 154 which is adapted to engage a limit switch 155 whenever the arms 108 and 109 are retracted. On the other hand, when the arms 108 and 109 are extended by the opposite movement of the piston 147, the dog 154 is disposed to engage a limit switch 156. The limit switches 155 and 156 are interconnected in the control circuit for effecting a tool interchange operation, as will hereinafter be more fully described.

Pivotal movement of the tool range member 107 is effected by means of a fluid motor 161. The motor 161 is operable in either direction to pivot the tool change member 107 180° in either direction depending upon the phase of the tool change cycle. The motor 161 is provided with a drive shaft 162 that extends through the front face of the carriage 106 and is operatively coupled to the tool change member 107 to effect its pivotal movement.

For interchanging the position of the tools gripped by the tool grips 108 and 109, the tool change member 107 must be rotated 180° so that the position of the tool change arms will be reversed 180° from the position shown in FIG. 11. On a subsequent tool change operation the tool change member must be rotated 180° in the opposite direction so that the tool grips 108 and 109 are returned to the position shown in FIG. 11. Assuming that the tool change member 107 is in the position shown in FIG. 11, wherein the tool grip 108 is extended and gripping a tool from the magazine 82, and that the tool grip 109 is extended and gripping a tool from the spindle 47, and that the carriage 106 has been extended to extract the two tools from the magazine and the spindle respectively, a rotational movement of 180° must be imparted to the tool change member 107 to pivot the tool change member from the position shown in FIG. 11, to a position 180° reversed therefrom so that the location of the tool grips 108 and 109 will be reversed. The pivotal position of the tool change member 107 is indicated in the electrical circuit by a pair of limit switches 163 and 164 that are actuated alternatively by a dog 165 depending upon the pivotal position of the tool change member 107.

As hereinbefore explained, the process of preselecting a tool in response to coded tape input information is effected during the performance of a different preceding machine function, usually a machining operation. Thus, when the particular machine operation is complete, a preselected tool has already been moved into the tool change station adjacent to the tool change mechanism 80. At that moment, in the event a tool change function is called for by the control tape, the spindle head 43 is moved bodily along the "X" and "Y" axes to position the spindle 47 in a ready station adjacent to the tool change mechanism 80, as shown in FIG. 1.

At the start of a tool change cycle, the carriage 106 and the pivotably mounted tool change member 107 are maintained at their retracted position on the supporting bracket 105. From this position the tool grips 108 and 109 may be extended into engagement with tool holders respectively carried by the storage magazine 82 and the tool spindle 47. When the tool grips 108 and 109 have engaged and gripped the tool holders in the magazine and spindle, the carriage 106 and the tool change member 107 are fully advanced for withdrawing the two tools from the magazine and spindle. When the carriage 106 is fully advanced to extract a tool from the magazine 82 and another tool from the spindle 47, the tool change member 107 may be selectably pivoted either in a clockwise or counterclockwise direction, as required, to effect an interchange in the position of the tools carried respectively by tools grips 108 and 109. When selective pivotal movement of the tool change member has been effected to interchange the position of the two tools extracted from the magazine 82 and the spindle 47, the carriage 106 is retracted for inserting the interchanged tools into the magazine 82 and the spindle 47. The tool grips 108 and 109 are actuated to release the two tools and are then retracted within the housing of the tool change member 107.

As previously mentioned, the table base 57 is pivotally movable about the horizontal axis 58 so that the surface of the rotatable work supporting table 60 may be located in any selected angular position with respect to the axis of the spindle 47. Such tiltable movement of the base 57 is effected by means of the pair of identical transmissions 71 and 72 contained within the transmission cases 73 and 74. To facilitate the description, only the transmission 72 contained within the transmission case 74 and the associated drive mechanism will be described in detail since it will be apparent that the transmission 71 and its associated drive mechanism is identical in construction and operation. Where deemed advantageous, appropriate corresponding parts associated with the transmission 71 are identified by the same reference numeral as that applied to the same part in the transmission 72 except that those parts associated with the transmission 71 are identified by the suffix "L." As shows in FIGS. 3, 4 and 5, the table base 57 is provided with a sector 206 that is disposed on and secured to a suitable mounting surface 205 formed in the right side of the base 57. At its top and rear surface the base 57 is provided with an upstanding portion 207 that is provided with a bearing 233 for receiving a stub shaft 208, which is mounted on the saddle 56 for pivotally supporting the table base 57 and its associated table 60.

The shaft 208 is supported by a post 211 that extends upwardly from the right rear corner of the saddle 56. An identical post 211L extends upwardly from the left rear corner of the saddle 56 for carrying a shaft identical to the shaft 208, as shown in FIG. 4. The post 211 is provided with a boss 212 having a bore 213 in which the shaft 208 is disposed and constrained from rotation by means of a key 214. Further, a screw 216, engaged in a suitable threaded opening 217 is adapted to engage a suitable notch 218 formed in the peripheral surface of the shaft 208 for securing the shaft within the bore 213. The shaft 208 is further constrained from axial outward movement by a washer 221 that engages against a radial shoulder 222 formed by a counterbore 219. The washer 221 is secured to the inner end of the shaft 208 by a screw 223.

An outwardly extending portion 226 of the shaft 208 is enlarged and forms a shoulder 227 which engages against the side of the boss 212 as the washer 221 and screw 223 operate to draw the shaft 208 axially leftwardly. Thus, the shaft 208 is effectively prevented from moving axially in either direction by means of the washer 221 and the shoulder 227. The enlarged portion 226 of the shaft 208 extends inwardly into a bore 231 formed in the upstanding portion 207 concentric with the bore 213. A counterbore 232 receives an antifriction bearing 233 that is mounted on the enlarged portion 226 of the shaft 208 to antifrictionally support the table base for pivotal movement about the shaft 208. A retainer plate 234 is secured within a suitable recess formed in the outer surface of the upstanding portion 207 by suitable screws [not shown] for retaining the bearing 233 within the counterbore 232. Thus, the table base 57 is hinged for pivotal movement about the shaft 208 carried by the saddle post 211 and by a complementary identical shaft [not shown] on the left side of the saddle 56 by the post 211L. The axes of the right shaft 208, associated with the right post 211, and the left shaft [not shown], associated with the left post 211L, are aligned and form the axis 58 about which the table 57 pivots, as previously mentioned.

The right sector 206 and the left sector 206L are provided with sector gears 241 and 241L, respectively, that are bolted or otherwise secured to the peripheral surface of the associated sectors. For effecting pivotal movement of the table base 57 about the shafts 208, the right sector gear 241 and the left sector gear 241L are respectively driven by the transmissions 72 and 71 which are identical in construction and operation, as previously mentioned. As shown in FIGS. 3, 4 and 5, the sector gear 241 is in meshing engagement with a gear 246 that is secured to rotate with a shaft 247 rotatably supported in antifriction bearings 243, 244 and 245 carried in suitable supports formed in the upper portion of the gear case 74. The shaft 247 is rotatably driven by a spiral bevel gear 249 disposed in a gear compartment 250 formed in the upper portion of the gear case 74. The bevel gear 249 is coupled to rotate with the shaft 247 by a key 251. For retaining the bevel gear 249 in operating position on the shaft 247, the outer end of the shaft 247 is provided with a threaded portion 252 which receives a nut 253 disposed to engage the end of the hub of the bevel gear 249. The extreme outer end of the shaft 247 is journaled in the antifriction bearing 245 disposed within a suitable recess formed in an inwardly extending boss 254 formed on a gear compartment cover 256 secured in well known manner to the outer face of the gear case 74.

Power for rotating the shaft 247 is transmitted to the bevel gear 249 by a pinion 260 integrally formed on the upper end of a vertically disposed shaft 261, as clearly shown in FIG. 3. The shaft 261 extends through a suitable bore 262 formed in an internal web section of the gear case 74 and is rotatably supported therein by bearings 263 and 264 that are disposed at each end of the bore 262. The lower end of the shaft 261 extends into a lower gear compartment 266 formed in the bottom portion of the gear case 74, as shown in FIG. 3. The extreme lower end of the shaft 261 is journaled in an inwardly extending boss 267 formed on the inner surface of a gear compartment cover 268 secured to the bottom surface of the gear case 74. A bevel gear 271 is keyed to the lower end of the shaft 261.

The bevel gear 271 is driven by a pinion 276 integrally formed on the inner end of a shaft 277 rotatably supported in a pair of antifriction bearings 278 and 279 disposed in an opening 280 provided in a boss 281 that is formed on the inner wall of the gear case 74.

As shown in FIG. 3, an inwardly extending end 292 of the shaft 277 is in splined engagement with a horizontal power transmitting shaft 295 that is rotatably supported in a transverse communicating opening 296 formed in the saddle 56 concentrically with the opening 280 in the boss 281. The opposite or inwardly extending end of the power transmission shaft 295 is journaled in a depending bracket 297 that is secured to the under surface of the saddle. The inner end of the shaft 295 is connected to be driven by a relatively large gear 298 rotatably supported in the bracket 297. A relatively small gear 299 that is secured on a shaft 301, and also journaled in the bracket 297, is in meshing engagement with the gear 298 to effect a power drive to the transmission 72.

Power input to the gear 299 is effected by means of the hydraulic motor 70 secured to the outer face of the bracket 297 and which has a drive shaft 302 operably connected, in a well known manner, to drive the shaft 301 for rotating the driving gear 299. Thus, selective operation of the hydraulic motor 70 in either direction will effect the rotation of its drive shaft 302, which, in turn, operates to drive the shaft 301 and the gear 299. The gear 299 rotates its cooperating gear 298 and thereby drives the shaft 295 which is spline connected to the shaft 277 for driving the relatively small pinion 276 that, in turn, is meshed with the lower bevel gear 271. The power is transmitted from the bevel gear 271 through the shaft 261 to drive its associated pinion 260. From the pinion 260 the transmission of power continues to the bevel gear 249 that, in turn, operates to drive the shaft 247 and the gear 246. Power is transmitted from the gear 246 to the sector rack 241 for pivoting the table base 57 about the axis 58.

The motor 70 is likewise disposed to supply a power drive to the gear transmission 71 within the gear case 73 through the gear 298 which is also connected to drive a leftwardly extending power transmitting shaft 295L connected to the transmission 71 within the transmission case 73 in the identical manner as described for the transmission 72. Thus, it is apparent that when the motor 70 is operated to effect upward pivotal movement of the table base 57, both of the transmissions 71 and 72 are connected to be driven simultaneously to effect a power input to the right and left sector racks 241 and 241L for effecting the pivotal movement of the table base 57 about the right shaft 208 and the left shaft (not shown).

A positioning control 307 for effecting desired angular positioning of the table base, so as to present the surface of the rotary table 60 at a selected desired angle relative to the axis of spindle 47, is shown in detail in FIGS. 7 and 8. The control 307 is located within a compartment 308 of a case 309 secured to the outer face of the plate portion 207 of the sector 206. Positioning control devices, such as the device 307, are well known commercially available units. The exemplary embodiment comprises essentially an arcuate scale 311 which is mounted to move with the table base 57 relative to cooperating sensing heads 312 and 312A. The arcuate scale 311 is fixedly secured to rotate with a mounting plate 313 that is secured to the retainer plate 234. Accordingly, pivotal movement of the table base 57 about the right shaft 208 and the left shaft (not shown) will operate to produce a like movement of the arcuate scale 311.

A circular hub 322 of a sensing head supporting bracket 323 is positioned concentrically on the end of the shaft 208 and secured thereto by means of screws 324. The hub 322 serves to space the bracket 323 apart from the arcuate scale 311 a distance sufficient to provide room for the sensing heads 312 and 312A which are secured to the inner surface of the bracket 323, as shown in FIG. 7. Each of the sensing heads 312 and 312A is provided with a slot 326 which is disposed to receive the arcuate scale 311 so that the angular position of the table base, as indicated by the scale 311, may be sensed by the sensing heads and compared with the desired angular position to which it is desired to position the table and an error signal obtained to effect a control of the motor 70 by regulating the operation of a servo valve 325. The servo valve 325 for effecting the selective operation of the hydraulic motor 70 is mounted on the motor 70, as shown in FIG. 3. The shaft 301, driven by the motor 70 has its opposite end 330 operatively connected to drive an input shaft 331 of a tachometer 332 which is secured to the outer surface of the bracket 297 and is protected by a cover. The tachometer 332 is utilized in the control circuit, to be subsequently described, for providing information as to the velocity of the table base 57 as it is pivoted about the axis 58.

As previously mentioned, the table base 57 operatively supports the table 60 for rotation and also supports the table drive transmission, as well as, the table drive motor 75. The work table 60 is journaled in the supporting table base 57 with the circular edge portion of the table being carried by an outer vertical circular web 361, the outer surface of which constitutes the periphery of the table base as best seen in FIG. 6. The circular web 361 of the base 57 is provided with a suitable annular recess in which is disposed a circular seal 362 that is adapted to be engaged by an annular surface 363 formed on the under surface of the table 60. The table is rotatably supported by a circular bearing way 366 which is fastened to a suitable annular seat 367 formed on the under surface of a horizontal internal web 368 of the table 60. The way 366 is disposed to slidably engage upon a complementary annular way surface 369 formed on the top surface of an internal horizontal web 370 of the table base 57.

For centering the table 60 on the table base, the latter is provided with an inner circular flange 371 which forms a bore 372 for receiving a center post 373 that serves as a bearing for guiding the table 60 in its rotational movement. The center post 373 is journaled in a pair of antifriction bearings 374 and 376 which are disposed in suitable concentric recesses provided in the inner circular flange 371 of the table base. A locknut 377 is threadedly engaged on the lower end of the center post 373 and is adapted to engage the outer surface of the inner race of the lower bearing 376 and serves to lock the center post in operative position relative to the table base 57. The table 60 is provided with an axial bore 378 which is adapted to embrace an upwardly projecting reduced circular portion 379 of the center post 373. When disposed and mounted upon the reduced portion 379 of the center post 373 the table 60 is concentrically aligned with the axis of the center post 373. For securing the table 60 to the center post 373, the latter is provided with a radially extending flange portion 381 that is engaged by a lower surface 382 of a circular horizontal internal web section 383 that is formed in the table 60. The table 60 is secured to this radial flange 381 by a plurality of screws 384, one of which is shown.

Rotational drive of the table 60 is accomplished by means of a bull gear 386 which is secured about the periphery of the radial flange portion 381 by screws 387. A pinion 388 is integrally formed on the end of a vertical shaft 389 that is rotatably journaled in a transmission gear case 391. The pinion 388 is in driving engagement with the bull gear 386 for transmitting the rotational drive to the table 60 from a transmission (not shown) contained within a transmission case 391. The transmission case 391 is located within a compartment 392 formed within the table base 57 and is accessible through an opening provided in the bottom of the table base and which is closed by means of a suitable cover 393.

Power input to the transmission 391 is obtained from the hydraulic motor 75 which is mounted on a bracket 394 integrally formed with the base 57. A gear 406 is integrally formed on the end of a shaft 407 that is rotatably supported within a vertical bore 408 formed in the bracket 394. The gear 406 is operatively connected to be driven by the downwardly extending drive shaft 409 of the hydraulic motor 75. The lower end of the bore 408 is closed by a cover 411 having a boss that extends inwardly into the bore and in which an axial opening is formed to receive the lower end of the shaft 407 for maintaining the shaft in axial alignment within the bore. The gear 406 is in meshing engagement with an input gear 412 that is operatively disposed within the gear case 391 and is part of the transmission for imparting a power drive to the pinion 388. The gear 412 extends from the gear compartment 392 inwardly into the bore 408 of the bracket 394 through a suitable transverse opening 414 formed in the outer wall of the table base 57.

The rotary velocity of the table 60 is indicated by a tachometer 420 which is mechanically connected to be driven by the motor 75 as it operates to rotate the table 60. To accomplish this, an output gear 421 is fixedly secured to the lower end of the shaft 407. The gear 421, in turn, engages a cooperating gear 422 fixedly pinned to the inner end of a stub shaft 423, the latter being rotatably supported by a bearing 424 having its outer race constrained within a suitable bored opening in a bracket extension 426 that is integrally formed with the bracket 394. The stub shaft 423 is connected via a coupling 427 to drive a tachometer shaft 429, the tachometer 420 being secured on the upper external surface of the bracket extension 426. A case or cover 428 is provided to protect the tachometer from damage.

As previously mentioned, the table 60 may be continuously rotated or may be selectively located in a rotary position so as to orient a workpiece [not shown] carried on the surface of the table 60 at any desired angle with respect to the axis of the spindle 47. Rotary positioning of the table 60 is effected by means of a position control mechanism 441 which is similar in construction and operation to the position control mechanism 307 associated with the table base 57, previously described. The position control mechanism 441 comprises essentially an arcuate scale 461 carried by a bracket 462 which is secured to the extreme lower end of the center post 373 for rotation therewith by a plurality of screws 463, one of which is shown. Thus, rotary movement of the center post 373 will effect a like rotary movement of the scale 461. A pair of sensing heads 467 and 468 are fixedly secured to the inner surface of the circular mounting plate 469 and are disposed so that a slot 471 formed in each of the sensing heads 467 and 468, respectively, is disposed to cooperate with the scale 461 to provide informational position signals to the electrical control system for operating a servo valve 465 which is operable to control the operation of the motor 75.

Radial adjustment of the circular mounting plate 469 may be necessary from time to time so that the sensing heads 467 and 468 may be maintained in proper operating position with respect to the scale 461. To this end, the circular plate 469 is provided with a hub 473 having a bore with a diameter that is larger than the diameter of the reduced portion of the center post about which it is mounted. The arrangement of the plate 469 is such that it is adjustable radially within its limits of movement to effect the desired orientation of the sensing heads with respect to the scale 461. Since the scale 461 is movable with the table 60, the sensing heads 467 and 468 are maintained stationary. Accordingly, the circular mounting plate 469 is mounted on the table base 57 which is stationary relative to the table 60 and its supporting center post 373. To this end, the circular flange 371 is provided with an enlarged circular recess 474 which receives a circular mounting ring 476 that is secured within the recess by means of screws 477. The mounting ring 476 includes a depending circular flange portion 478 which is provided with three set screws 479, one of which is shown, that are equally spaced about the periphery of the flange. These set screws are threadedly engaged in suitable threaded openings provided in the flange 478 and are disposed to engage the periphery of the circular mounting plate 469. Thus, by adjusting the set screws 479 the radial position of the circular mounting plate 469 may be adjusted within its limits of movement so that the slot 471 of the sensing heads 467 and 468 may be oriented with respect to the sides of the scale 461. After the mounting plate 469 has been accurately located by adjustment of the screws 479 it is secured to the mounting ring 476. This is accomplished by tightening a plurality of screws 481, one of which is shown, that are inserted through suitable openings formed in the mounting plate 469, the diameter of the openings being larger than the diameter of the screws 481. The screws 481, in turn, threadedly engage suitable threaded openings provided in the ring 476. Since the openings provided in the mounting plate 469 are larger in diameter than the diameter of the screws 481, radial adjustment of the mounting plate 469 by actuation of the set screw 479 may be accomplished.

Provision is made for counterbalancing the pivotably movable table base 57 so as to relieve the weight of the table base from its drive transmission. Such counterbalancing of the table base is effected by a pair of counterbalancing mechanisms 491 and 492 shown in FIGS. 2, 4 and 5, and schematically in FIG. 12. As shown, the counterbalancing mechanisms 491 and 492 are disposed on either side of the saddle 56 and are connected to the respective left and right sides of the table base 57. The counterbalancing machanisms are identical in construction and operation and to facilitate description only the counterbalance mechanism 492 will be described and the description and operation given will also pertain to the counterbalance mechanism 491. Corresponding parts associated with the counterbalance mechanism 491 are identified by the same reference numerals as those used to identify the parts in the counterbalance mechanism 492, with the exception that those parts associated with the counterbalance mechanism 491 are identified by the suffix "L."

The mechanism 492 comprises a cylinder 496 which is pivotably secured at its lower end to a bracket 497 of U-shaped configuration that, in turn, is rigidly secured to the right side of the saddle 56. A piston 498 is reciprocally supported within the cylinder 496 and is provided with a piston rod 499 that extends outwardly of the top end of the cylinder 496 and is coupled to a bracket 501. The bracket 501 is provided with a bore 502 which receives the outwardly extending end of a stub shaft 503 that is rigidly mounted in the right side of the table base 57. This connection between the bracket 501 and the stub shaft 503 permits a pivotal movement of the bracket relative to the shaft. Thus, the pivotal connection of the free end of the piston rod 499 to the table base 57 and the pivotal connection of the lower end of the cylinder 496 to the saddle 56 enables the counterbalance mechanism 492 to adjust itself for any angular position to which the table base 57 may be moved.

As the table base 57 moves in a pivotal movement about the axis 58, hydraulic fluid at reduced pressure is supplied to a chamber 504 at the lower end of the cylinder 496 at the head side of the piston therein. The flow of fluid pressure is maintained to the chamber 504 so that substantially the entire weight of the table base 57, the rotary work supporting table 60, the table transmission and the fluid motor 75 is supported by the fluid within the chambers of the respective cylinders 496 and 496L to relieve the load on the table base drive transmission. When the table base 57 has been positioned at the desired angle, the flow of fluid pressure is continued to the respective cylinders, with means being provided to return excess fluid pressure to its source as will be subsequently described, so that the table base will be held in the desired position. When it is desired to return the table base to the horizontal position on the saddle 56 the hydraulic fluid in the chambers 504 and 504L is exhausted therefrom at a controlled rate so that the weight of the table, as it is lowered, is not placed upon the table base transmission.

Auxiliary table base lock mechanisms 508 and 509 are provided in the table base transmission casings 73 and 74 that act upon the left and right table sectors 206L and 206 respectively. The mechanisms 508 and 509 are friction applying devices which operate to apply a force to each side of the table base 57 and are sufficiently powerful to hold the table base at any angular position that it may be moved to without the assistance of the counterbalancing mechanisms 491 and 492. These friction applying mechanisms 508 and 509, in combination with the counterbalancing mechanisms 491 and 492, and the braking effect of the table base transmission, operate to maintain the table base 57 and its associated structure at any angular position to which it may have been moved so that the table base always serves as a rigid supporting base for the rotary table 60 for maintaining the positional accuracy required of the machine.

The friction applying mechanism 509 is shown in detail in FIG. 9 and its operation and construction is identical to that of the mechanism 508. The mechanism 509 is disposed within the transmission case 74 and comprises a cylinder sleeve 516 which is disposed within a suitable transverse bore 517 provided in the upper right corner of the transmission case 74. The outer end of the cylinder 516 is provided with a flanged head 518 which is disposed within a recess 519 provided in the face of the transmission case 74 and which is coaxial with the bore 517. The cylinder 516 is secured in position within the bore 517 by means of a plurality of screws 520, one of which is shown.

A piston 522 having a piston rod 523 integrally formed therewith is reciprocally supported within an outer chamber 524 formed within the interior of the bore of the sleeve 516 by a transverse web or partition 526. The web 526 is provided with a concentric opening through which the piston rod 523 passes to extend through a chamber 527 formed on the opposite side of the web 526. The free end of the piston rod 523 threadedly receives a clamp head 528 that is adapted to engage against the side of the sector 206 of the table base 57. The clamp head 528 is of circular configuration having a diameter which is complementary to the diameter of the chamber 527 to permit the head 528 to move a limited amount into the chamber 527. A resiliently expansible stack of disc springs 531 is disposed between the inner end of the clamp head 528 and a thrust washer 532, the latter abutting the web 526. Thus, the springs 531 are normally operative to urge the clamp head 528 outwardly of the chamber 527 into frictional engagement with the side of the sector 206. Thus, the two clamp mechanisms 508 and 509 act in unison by operation of their springs 531 and 531L to urge their respective clamp heads 528 and 528L toward each other against their associated table sectors 206 and 206L to clamp the table base 57 between them in the desired position.

To release the clamp head 528 from engagement with the side of the sector 206, prior to effecting angular movement of the table base 57, it is necessary to overcome the pressure applied by the disc springs 531 by urging the piston 522 outwardly of the chamber 524, to move the clamp head 528 into the chamber 527. Such releasing movement of the clamp head 528 is effected by supplying fluid pressure to the chamber 524 so that the fluid pressure will react upon the piston 522 to move it axially outwardly of the chamber 524 a sufficient distance to release the clamp head 528 from clamping engagement with the side of the sector 206. Fluid pressure is supplied to the chamber 524 through a conduit 536 which is operatively connected to an axially extending passage 537 formed in the piston 522. The inner end of the passage 537 communicates with an angularly disposed passage 538 that communicates with the chamber 524.

As shown in FIG. 10, there is provided a hydraulic circuit for operating the tool spindle motor 48 and a spindle collet mechanism 550. Hydraulic fluid under pressure is withdrawn by a pump 551 driven by a motor 552 from a sump 553 to supply fluid pressure to lines 554 and 556. A servo control valve 557 is schematically represented as interconnected between the supply line 554 and a supply line 558 connected to the hydraulic motor 48. Another hydraulic line 559 is connected between the motor 48 by way of the servo valve 557 to a line 561. The servo control valve 557 is operative in a well known manner under the control of a motor 562 to selectively vary the rate of rotation of the spindle motor 48. The line 556, supplied with fluid pressure from the pump 551, is connected to supply fluid pressure to the inlet port of a control valve 563 associated with the mechanism for effecting collet clamping or release. Another port of the control valve 563 is connected to the exhaust line 561 by means of a connected line 564. With a valve spool 570 of the control valve 563 in a central neutral position, as shown in FIG. 10, the inlet pressure line 556 is connected via a port in the valve spool to a line 571, as well as to the exhaust line 564. Thus, fluid pressure from line 571 flows into a cylinder 573 at reduced pressure to retain a piston 574 in a rightward position relative to its cooperating cylinder for maintaining the collet 52 in clamping engagement with a tool holder to maintain a tool within the spindle 47. Energization of a solenoid 576 effects leftward movement of the valve spool 570 thereby connecting the pressure supply line 556 to a hydraulic line 577 via a passage 578 formed in the valve spool 570. With the valve spool 570 in its leftward position, the hydraulic line 571 is connected via another passage 579 in the valve spool to the exhaust line 564. Under this condition, fluid pressure from the line 577 into the cylinder 573 effects leftward movement of the piston 574 for moving the collet 52 leftwardly a slight distance relative to the tool spindle 47 to release a tool secured therein. Whenever the collet 52 is to be reclamped for securing a tool in operative engagement within the tool spindle 47, the solenoid 576 is deenergized and a solenoid 581 is energized to effect movement of the valve spool to its extreme rightward position. With the valve spool in rightward position, fluid from the rightward end of the cylinder 573 is exhausted via the line 577, a passage 582 formed in the valve spool 570, to the exhaust line 564. At the same time, fluid pressure from supply line 556 flows through another passage 583 formed in the valve spool to the line 571 and thence to the left end of the cylinder 573 effecting rightward movement of the piston 574 relative to its associated cylinder to effect a clamping engagement of the collet 52 locking the tool within the spindle 47. Whenever the collet 52 is actuated in a clamping action, a dog 584 schematically shown as being secured to the outer end of a rod 586 that is attached for movement with the piston 574 will actuate a limit switch 585 for conditioning the electrical control circuit for further sequential operation of the machine. On the other hand, when the piston 574 has been actuated leftwardly within the cylinder 573 for effecting the release of the collet 52, the dog 584 will move out of engagement with the limit switch 585 to effect the release of the limit switch. When the limit switch 585 is released it will operate to condition the electrical control circuit for effecting the operation of the tool change mechanism for withdrawing a tool from the spindle.

As schematically represented in FIG. 11, there is provided a hydraulic control circuit for operating the tool storage magazine to move a preselected tool into position, as well as for effecting proper sequential movement of the various parts of the tool change mechanism 80. As there shown, a pump 590 driven by a motor 591, is connected to withdraw hydraulic fluid from a sump 592 for providing fluid pressure to a main supply line 593. A pressure regulating valve 594 is interconnected between the pump 590 and an exhaust line 596 in a well known manner for supplying the fluid to the line 593 under uniform pressure with excess fluid being returned to the sump 592 via the exhaust line 596. For effecting the required rotational movement of the tool storage magazine 82, its drive motor 115 is under the control of a solenoid actuated valve 600. With a valve spool 601 of the control valve 600 biased to its central neutral position, as shown, both sides of the drive motor 115 are connected via lines 602 and 603 through passages in the valve spool to the main exhaust line 596.

Rotation of the motor 115 may be effected for moving the magazine in a counterclockwise direction for effecting a tool selecting operation by energizing a solenoid 630 to effect rightward movement of the valve spool 601, connecting the fluid pressure line 593 to the line 603 via a passage 631 formed in the valve spool. The flow of fluid pressure to the line 603 continues through an open check valve 632 to the motor 115 to effect a counterclockwise rotation of the magazine. Return fluid from the motor 115 will flow through a flow control valve 633 and line 602 to the control valve. The return fluid will flow through the valve via a passage 634 formed in the valve spool to the exhaust return line 596.

The fluid pressure in the line 603 for operating the motor 115 to effect the counterclockwise rotation of the magazine 82 in a tool selecting operation will also flow through a connected line 612 to a cylinder 613, effecting movement of a piston 614 in opposition to a spring 616. Any fluid by-passing the piston 614 will exhaust through a line 617 to a sump 618 connected in a well known manner to return fluid to the common or main sump 592. Leftward movement of the piston 614 affects a corresponding leftward movement of the outer end of a lever 621 pivoted at its opposite end upon a shaft 622 carried by the tool change supporting frame 105. Towards its central portion the lever 621 is provided with a cam roller 625 that is normally disposed to be urged by the spring 616 into engagement with a cam surface presented by a rotatable cam plate 626. The cam plate 626 is disposed to rotate 360° for each 12° of rotation of the tool storage magazine, FIG. 1. As each succeeding tool carried by the magazine passes through the tool change station, a circular recess 627 presented by cam plate 626 is moved into a position wherein it can be engaged by the cam roller 625. However, at this time, the piston 614 is in a leftward position by reason of fluid pressure being supplied to the right end of the cylinder 613 via the line 612. Therefore, the cam roller 625 is held in retracted position and does not engage the circular recess 627 of the cam plate 626.

The motor 115 will continue to operate to rotate the tool storage magazine 82 as well as the cam plate 626 in a counterclockwise direction. This rotation of the magazine 82 continues until such time as the selected tool is in proximity to the tool change station. When this occurs, the solenoid 630 will be deenergized. Deenergization of solenoid 630 permits a return movement of the valve spool 601 to its central neutral position connecting both of the motor supply lines 602 and 603 to exhaust to stop the motor 115 for positioning the preselected tool in close proximity to the tool change station. Since line 612 is now connected to exhaust via the line 603, the spring 616 operates to urge the piston 614 rightwardly to urge the cam roller 625 outwardly into engagement with the cam surface of the cam plate 626.

At this time, the solenoid 604 associated with the valve 600 is energized and effects leftward movement of the valve spool 601 connecting the fluid pressure line 593 with the line 602 via a passage 606 formed in the valve spool. Fluid pressure then flows from the line 602 through an open check valve 607 via a line 638 to actuate the hydraulic motor 115 for rotating the magazine 82 in a clockwise direction for effecting the final precise positioning of the selected desired tool. For controlling the rate of rotation of the motor 115 at a creep rate, fluid is exhausted therefrom via an adjustable flow control valve 609 connected via the line 603, a passage 611 formed in the valve spool 601, to the exhaust line 596.

As the motor 115 operates to move the magazine 82 in a clockwise direction at a creep rate, the cam plate 626 moves with it and when the recess 627 in the periphery of the cam plate moves under the cam roller 625, the cam roller 625 enters the recess to actuate the limit switch 728. Actuation of the limit switch 728 deenergizes the solenoid 604 to stop motor operation and thereby effects precise final positioning of the selected tool at the tool change ready station.

Prior to effecting a tool change, the code actuating switch mechanism 118 is pivotably retracted to withdraw the switch actuating fingers 117 from engagement with the rings presented by the code collar 119. This is accomplished by operation of the switch retracting cylinder 126 which is responsive to the operation of solenoid control valves 608 and 639. During rotational movement of the tool storage magazine, the switch mechanism 118 is pivoted outwardly so that the switch actuating fingers 117 are moved into the circular path of travel of the successive coded collars associated with each of the tools in the storage magazine. To this end, a solenoid 643 associated with the control valve 608 is energized, affecting rightward movement of the associated valve spool 641 to connect the pressure supply line 593 to a line 644 via a connecting line 646 and a passage 647 formed in the valve spool. Fluid pressure from the line 644 enters the cylinder 126 affecting rightward movement of the piston 128 reciprocally supported within the cylinder 126. The rightward movement of the piston 128 operates to maintain the coded switch control mechanism in outward operating position for cooperation with the coded collars. When the control valve 608 is conditioned to supply fluid pressure to the left end of the cylinder 126, the right end of the cylinder is connected to a line 649 which, in turn, is connected to the control valve 639 so that fluid in the right end of the cylinder will exhaust therefrom and be returned to the exhaust line 596 via a connecting passage 651 formed in the valve spool 642 of the control valve 639. At this time, the exhaust fluid flowing from the line 649 to the valve 639 will flow through an adjustable flow control valve 652 which is set to regulate the rate of the rightward movement of the piston 128 for moving the switching mechanism 118 to its outward operating position.

Upon arrival of the preselected tool in the tool change ready station, the solenoid 643 of the valve 608 is deenergized permitting leftward movement of the valve spool 641 and thereby connecting the hydraulic line 644 to exhaust via a passage 653 in the spool 641, a flow control valve 654 and a line 655. Simultaneously therewith, a solenoid 656 associated with control valve 639 is energized to effect rightward movement of the valve spool 642 thereby connecting the pressure line 593 to the line 649 via a connecting passage 657 formed in the valve spool. Fluid pressure supplied to the line 649 will flow to the cylinder 126 to urge the piston 128 therein leftwardly to retract the switch mechanism 118 from its operating position. The rate of the retracting movement of the switch mechanism is regulated by the adjustable flow control valve 654 through which the exhaust fluid from the left end of the cylinder 126 flows as it is returned to the reservoir 592.

As shown in FIG. 11, the extension of the tool grips 108 and 109 into engagement with tools at the tool ready station and spindle, or the retraction of tool grips within the tool change member 107, is effected by means of the piston and cylinder mechanism 145 that is connected to be activated by fluid control valves 661 and 662. Whenever the tool grips are fully retracted within the tool change member 107, a solenoid 663 associated with the valve 661 is energized to move a valve spool 664 of the valve rightwardly in opposition to a spring 665, thereby connecting pressure line 593 via connected lines 566 and 567, a passage 568 formed in the valve spool and thence by means of a line 569 to the bottom end of the cylinder 146 of the fluid motor causing upward movement of a piston 147 associated therewith for moving the associated rack 149 upwardly. With the piston 147 in its upward position within the cylinder 146, the rod 153 attached to the piston is moved upwardly so that the dog 154 carried by the rod is moved into position to actuate the limit switch 155. As this occurs, the fluid in the upper portion of the cylinder 146 is exhausted via a hydraulic line 676, a passage 677 formed in a valve spool 678 of the valve 662 which, at this time, is deactivated. The flow of fluid continues from the passage 677 through a flow control valve 679 and a common line 680 connected to the main exhaust line 596.

Movement of the tool grips 108 and 109 from retracted to extended gripping position is effected by deenergization of the solenoid 663 of the valve 661 and energization of a solenoid 683 of the valve 662. With the solenoid 663 deenergized, the valve spool 664 is moved to its leftward position by the operation of the spring 665 thereby connecting the lower end of the cylinder 146 to exhaust via the line 569, a passage 684 in the valve spool 664, a flow control valve 685 and a line 686 that is connected to the common line 680, which, in turn, is connected to the return line 596. With the solenoid 683 of the valve 662 energized, the valve spool 678 is moved upwardly, as viewed in FIG. 11, thereby connecting the fluid pressure line 566 with the line 676 via a passageway 688 formed in the valve spool and now positioned to register with both the line 676 and the line 566. The flow of fluid into the upper portion of the cylinder 146 through the line 676 will effect downward movement of the piston 147 and thereby the rack 149 to effect the extension of the tool grips 108 and 109 into gripping engagement with a tool at the tool change station and a tool in the spindle, respectively. As the piston 147 is caused to move downwardly the rod 153 will move with it thereby moving the dog 154 out of engagement with the limit switch 155 and will position the dog so as to actuate a limit switch 156 for conditioning the electrical control system for subsequent operation.

After the tool grips 108 and 109 are moved into gripping engagement with the tools to be interchanged, the necessary outward movement of the carriage 106 and its associated grips 108 and 109 are effected by operation of the fluid actuator 136. At the start of the tool change cycle, the piston 138 is retained in a rightward position, as shown in FIG. 11, as the tool grips are brought into engagement with the tools to be interchanged. This condition is established by energizing a solenoid 694 of a valve 695 to effect rightward movement of an associated valve spool 696 in opposition to a spring 697, thereby connecting the main pressure line 593 to supply fluid pressure to a line 698, connected to the leftward end of the cylinder 137, via a passage 699 formed in the valve spool. Pressure admitted to the left end of the cylinder 137 will maintain the piston 138 in rightward position, so that a dog 141 secured to the connecting rod 139 is retained in engagement with a limit switch 143. Whenever the piston 138 is retained in its rightward position, the right end of the cylinder is connected to the return line 596 via a line 704, a passage 706 formed in a valve spool 707 of a control valve 708, which, at this time, is deactivated, and a flow control valve 709, so that the fluid may return to the sump 592.

After the tool grips 108 and 109 are moved into engagement with tools, and limit switch 156 is actuated, the carriage 106 is moved to extreme outward or leftward position, as viewed in FIG. 11, by corresponding leftward movement of the piston 138. This is accomplished by deenergizing the solenoid 694 of the valve 695 and energizing a solenoid 710 of the valve 708. With the solenoid 694 deenergized, the left end of the cylinder 137 is connected to exhaust via the line 698, a connecting passage 711 formed in the valve spool 696 and which, at this time, is in a leftward position as shown, and a flow control valve 712 to the exhaust line 596. The flow control valve 712 is operative to regulate the speed at which the piston 138 moves leftwardly to move the carriage 106 to extreme outward position.

With the left end of the cylinder 137 connected to exhaust, energization of the solenoid 710 establishes a hydraulic circuit from the main supply line 593 to the right end of the cylinder 137 via a line 713, a passage 714 formed in the valve spool 707, now positioned rightwardly within the valve body, and the line 704. As soon as carriage 106 reaches its extreme outward position, the dog 141 which is secured to the connecting rod 139 engages a limit switch 142. Actuation of the switch 142 initiates the 180° pivotal movement of the tool change member to interchange the position of the two tools engaged by the respective tool grips 108 and 109.

For interchanging the positions of the tools gripped by the tool change grips 108 and 109, the tool change member 107 must be rotated 180° so that the position of the tool change grips, as shown in FIG. 11, will be reversed. On a subsequent tool change operation, the tool change member must be rotated 180° in the opposite direction so that the tool change grips 108 and 109 are returned to the position shown in FIG. 11. Assuming that the tool change member 107 is in the position shown in FIG. 11, wherein the tool grip 108 is extended and in engagement with a tool from the magazine and the tool grip 109 is extended and in engagement with a tool from the spindle, and that the carriage 106 has been extended to withdraw the two tools from the magazine and spindle respectively, an interchange movement of 180° of rotation will be necessary to pivot the tool change member 107 from the position shown in FIG. 11, to a position 180° reversed therefrom so that the positions of the tool change grips 108 and 109 will be interchanged.

In the condition shown, the limit switches 163 and 164 are respectively operable to indicate the pivoted position of the tool change member 107. The switches 163 and 164 are secured in spaced apart relationship to the front face of the carriage 106, as schematically shown in FIG. 11, in a position to be respectively actuated by a dog 165 secured to the periphery of a plate 166 that is, in turn, secured to the drive shaft 162 of the tool changer drive motor 161. As previously mentioned, at the start of the tool changing operation, it will be assumed that the tool grip 108 is positioned in proximity to a tool in the storage magazine and the tool grip 109 is positioned in proximity to a tool carried by the tool spindle, as shown in FIG. 1. With this condition existing, the dog 165, shown in FIG. 11, is disposed to actuate the switch 164. The tool change member 107 is actuated in its rotational movement by means of the hydraulic motor 161 which is carried by the carriage or slide 106 and has its drive shaft 162 extending through the front face plate of the carriage 106 and operatively connected to the tool change member 107, as schematically shown in FIG. 11. The fluid motor 161 is responsive to operation of control valves 731 and 732.

A 180° clockwise rotational movement of the tool change member 107 is achieved by supplying fluid pressure to the fluid motor 161 by operating the valve 731. This is effected by energizing a solenoid 733 to move a valve spool 734 rightwardly in opposition to a spring 736 and thereby connecting the pressure line 593 to a line 737 by means of a passage 738 formed in the valve spool and now positioned to connect the pressure line 593 to the line 737. At this time, a solenoid 740 associated with the valve 732 is deenergized so that the exhaust fluid from the motor 161 will flow into a line 741 and through a passage 742 formed in the valve spool 743 associated with the valve 732 and which, at this time, is positioned in its leftward position by operation of the spring 744. The flow of the exhaust fluid continues through a preset flow control valve 745 and thence to the main return line 596. With the tool change member rotated 180° in a clockwise direction, the dog 165 will have been rotated into a position to actuate the limit switch 163 to indicate the position of the tool change member.

Counterclockwise rotation of the tool change member 107 for effecting a second cycle of interchange movement wherein the tool change grips 108 and 109 are moved to the position shown in FIG. 11, is effected by deenergizing the solenoid 733 of the valve 731 so that the spring 736 will operate to urge the valve spool 734 into its leftward position, as shown in FIG. 11. This will serve to connect the line 737 to the return line 596 through a preset control valve 746 by means of a passage 747 formed in the valve spool. Simultaneously therewith, the solenoid 740 of the valve 732 is energized to effect rightward movement of the valve spool 743 in opposition to the spring 744. Thereupon fluid pressure from the supply line 593 flows through a line 748 and thence through a connecting passage 749 formed in the valve spool, which is now positioned to connect the line 748 to the line 741. Thus, fluid pressure from the supply line 593 will flow to the motor 161 to effect its operation in a direction to rotate the tool change member 107 in a counterclockwise direction. As this occurs the fluid flowing through the motor will flow into the line 737 and be returned to the main return line 596 via the deactuated valve 731. Upon arrival of the tool change member 107 into the position shown in FIG. 11, the dog 165 is moved into engagement with the switch 164.

As shown in FIG. 12, there is provided a hydraulic circuit for operating the motors of the five major movable elements of the machine as well as the counterbalance mechanisms and the brake mechanisms associated with the table base. Hydraulic fluid under pressure is withdrawn by a pump 755 driven by a motor 756 from a sump 757 for providing fluid pressure to a main supply line 758. A pressure regulating valve 759 is interconnected between the pump 755 and a return line 760, in a well known manner, for supplying the fluid to the line 758 under uniform pressure with excess fluid being returned to the sump 757 via the exhaust line 760. For effecting positional movement of the spindle head 43 along the "Y" axis, the motor 44 is under the control of a servo valve 761 which is supplied with fluid pressure by operation of a solenoid actuated valve 762. With a valve spool 763 of the control valve 762 biased to its rightward position, as shown, the servo valve is connected via a line 764 and a passage 765 formed in the valve spool to the main return line 760. Energization of a solenoid 766 effects leftward movement of the valve spool 763, connecting the fluid pressure supply line 758 with the line 764 via a passage 767 formed in the valve spool and now positioned to connect the pressure supply line 758 to the line 764. Fluid pressure then flows from the line 764 to the servo valve 761 which is operative from a source of command signals to direct the fluid pressure to a line 768 for actuating the motor 44 in a direction to move the spindle head 43 downwardly. For controlling the rate of rotation of the motor 44, fluid is exhausted therefrom via a line 769 to the servo valve 761 which is now operable to control the rate of flow of exhaust fluid therethrough and to direct the exhaust fluid into a common return line 770 connected to the main exhaust line 760. On the other hand, should the desired movement of the spindle head 43 be in an upward direction the operational command signals that originate with the tape reader 885 in response to the information contained on a tape 878 that is being read by the reader will cause the servo valve 761 to operate so as to direct the fluid pressure supplied thereto to the line 769 to effect the operation of the motor 44 in the opposite direction for moving the head 43 upwardly. Under this condition the exhaust from the motor 44 will flow into the line 768 and be returned to the servo valve which operates to meter the exhaust fluid flowing therethrough for controlling the rate of upward movement of the head 43 with the discharge fluid flowing into the common return line 770 and thus returning to the main return line 760.

A similar arrangement is provided for the column 32 for effecting its movement either rightwardly or leftwardly as desired. For effecting the required movement of the column 32 for positioning the spindle along the "X" axis, the motor 34 is under the control of a servo valve 773 which is supplied with fluid pressure by operation of a solenoid actuated valve 774. With a valve spool 775 biased to its rightward position, as shown, the servo valve 773 is connected via a line 776 and a passage 777 formed in the valve spool, to the main return line 760. Energization of a solenoid 778 effects leftward movement of the valve spool 775, connecting the main fluid supply line 758 with the line 776 via another passage 779 formed in the valve spool and now positioned to connect the main supply line 758 to the line 776. Fluid pressure then flows from the line 776 to the servo valve 773, whereby operation of the servo valve under operational control of command signals from the tape reader 885 directs the fluid pressure to a line 781 to actuate the hydraulic motor 34 for effecting its operation in a direction to move the column 32 rightwardly. The fluid pressure to the motor 34 will flow therefrom into a connected line 782 and thence to the servo valve 773 which is operative at this time to meter the flow of exhaust fluid therethrough and to direct the exhaust fluid into the common return line 770 connected to the main return 760. However, should the operational command signals which control the servo valve 773 call for leftward movement of the column 32, the servo valve would then be operated to direct fluid pressure supplied thereto via the line 776 into the line 782 to effect the operation of the motor 34 in the opposite direction for moving the column 32 leftwardly. Under this condition, the flow of fluid through the motor 34 will flow into the line 781 and return to the servo valve to be metered thereby for controlling the rate of motor operation with the servo valve directing the exhaust fluid into the common return line 770 so that it returns to the main return line 760.

A similar arrangement is provided for moving the saddle 56 inwardly towards the column 32 or outwardly therefrom along the "Z" axis. For effecting the required movement of the saddle 56, the drive motor 64 is under the control of a servo valve 785 which is supplied with fluid pressure by operation of a solenoid actuated value 786. With a valve spool 787 of the valves 786 biased to its leftward position, as shown, the servo valve 785 is connected via a line 788 and a passage 789 formed in the valve spool to the main return line 760. Energization of a solenoid 790 effects rightward movement of the valve spool 787, connecting the fluid pressure supply line 758 to the line 788 through a passage 791 formed in the valve spool and now positioned to connect the supply line 758 to the line 788. Fluid pressure then flows from the line 788 to the servo valve 785 and by its operation under the operational control of command signals originating in the tape reader 885 will direct the fluid pressure to a line 792 to actuate the hydraulic motor 64 in a direction to effect inward movement of the saddle 56 towards the column. Fluid flowing through the motor 64 flows into a line 793 and returns to the servo valve which operates to control the rate of flow of the exhaust fluid for controlling the rate of operation of the motor 64. The metered exhaust fluid is discharged from the servo valve 785 into a connected common return line 794 which, in turn, is connected to the main return line 760. Should the command signals which control the operation of the servo valve 785 be such as to operate the servo valve for directing the fluid pressure into the line 793, the motor 64 will then be operated in the opposite direction for moving the saddle 56 outwardly away from the column. Under this condition, the flow of fluid through the motor 64 will be directed into the line 792 and be returned to the servo valve where it will be metered to control the rate of operation of the motor 64 and then discharged into the common return line 794 to return to the main return line 760.

For effecting the required pivotal movement of the table base 57 to position the rotary table 60 at a desired angle with respect to the axis of the spindle 47, the drive motor 70 associated with the table base 57 is under the control of a servo valve 325 which is supplied with fluid pressure under the control of a solenoid actuated valve 795. With the valve spool 796 of the valve 795 biased into its leftward position, as shown, the servo valve 325 is connected via a line 797 through a passage 798 formed in the valve spool to the main return line 760. Energization of a solenoid 799 effects rightward movement of the valve spool 796, connecting the main fluid pressure supply line 758 to the line 797 through a passage 800 formed in the valve spool. Fluid pressure then flows from the line 797 to the servo valve 325 which operates in response to command signals that originate with the tape reader, to direct the fluid pressure into a line 801 to actuate the motor 70 for effecting its operation in a direction to produce upward pivotal movement of the table base 57. For controlling the rate of rotation of the motor 70, fluid from the motor is exhausted therefrom into a connected line 802 which conducts the exhaust fluid back to the servo valve 325. The servo valve then operates to control the rate of discharge of the exhaust fluid into the common return line 794 to control the rate at which the motor 70 operates. However, should the command signal be such as to operate the servo valve for directing the supply of fluid pressure from the line 797 into the line 802, the flow of fluid from the line 802 to the motor 70 will effect the operation of the motor 70 in the opposite direction for pivoting the table base 57 downwardly. Under this condition the exhaust fluid from the motor 70 will enter the line 801 to return to the servo valve where the valve will operate to meter the flow therethrough so as to control the rate of operation of the motor 70 with the exhaust fluid being directed to the common line 794.

As the solenoid 799 of the valve 795 is energized for supplying fluid pressure to the servo valve 325 to actuate the motor 70 for pivoting the table base 57, a solenoid 803 of the valve 804 is also energized. Energization of the solenoid 803 operates to effect rightward movement of a valve spool 806, connecting the main fluid pressure supply line 758 to a common line 807 by means of a passage 808 formed in the valve spool to connect the main supply line 758 to the common line 807. The fluid pressure supplied to the common line 807 is directed into the communicating lines 536 and 536L and thence into the chambers 524 and 524L of the table base lock mechanisms 509 and 508 respectively. As previously described, fluid pressure to the chambers 524 and 524L will effect retraction of the heads 528 and 528L out of engagement with the opposite sides of the table base 57 to release the table base so that the motor 70 may operate to effect its pivotable movement. When the table base 57 has been pivotably moved to a desired selected position and the solenoid 799 of the valve 795 deenergized, the solenoid 803 of the valve 804 will be simultaneously deenergized. Deenergization of the solenoid 803 permits the valve spool 806 of the valve to be biased into its leftward position, as shown, to connect the chambers 524 and 524L via the lines 536 and 536L and the common line 807 to the return line 760 via a passage 809 formed in the valve spool. With the valve spool positioned as shown in FIG. 12, the fluid pressure in the chambers 524 and 524L of the lock mechanisms 509 and 508 respectively, is discharged therefrom and the stack of disc springs 531 and 531L respectively, associated with the mechanisms 509 and 508, operate to urge the table engaging heads 528 and 528L outwardly into engagement with the sides of the table base 57, as previously described.

As the motor 70 is operated to effect pivotal movement of the table base 57, the counterbalance mechanisms 491 and 492 are operative to carry the weight of the table base 57, as previously described. The supply of fluid pressure to the counterbalance mechanisms 491 and 492 is under the control of a solenoid actuated valve 810. The fluid pressure to the counterbalancing mechanisms 491 and 492 must be supplied thereto at a reduced pressure which is less than the system pressure. This is necessary to insure that the mechanisms 491 and 492 will not operate to overrun the table base transmission and tend to move the table base upwardly. Energization of a solenoid 811 effects rightward movement of a valve spool 812 of the valve 810, connecting the main fluid pressure supply line 758 to the chambers 504 and 504L of the counterbalance mechanisms 492 and 491 respectively. The flow of fluid pressure from the main supply line 758 will flow through a constant pressure regulating valve 813 and into a line 814 connected to the inlet port of the valve 810. The reduced pressure from the line 814 will flow through the valve via a passage 815 formed in the valve spool and now positioned to connect the line 814 to a line 816. The reduced pressure in the line 816 will flow through a check valve 817 and into a common line 818 connected to the cylinders 496 and 496L and communicating with the chambers 504 and 504L respectively. Thus, as the table base 57 is pivoted upwardly, the pistons 498 and 498L will move upwardly within their respective cylinders 496 and 496L while constant pressure is supplied to the chambers 504 and 504L to counterbalance the weight of the table base 57. The constant pressure regulating valve 813 is a well known commercially available type, and is operable to maintain the fluid flowing from the outlet side of the valve at a constant pressure. Thus, fluid at constant pressure is supplied to the chambers 504 and 504L with the excess fluid supplied to the valve 813 being returned to the sump 757 via a return line 821.

As the table base 57 is pivoted in a downwardly direction, the pistons 498 and 498L of the counterbalance mechanisms 492 and 491, respectively, will also move downwardly, thus, reducing the volume of the chambers 504 and 504L. However, it will be recalled that constant pressure is being supplied to the chambers 504 and 504L. Thus, the pistons 498 and 498L in moving downwardly will tend to reverse the flow of the constant pressure that is being supplied to the chambers 504 and 504L via the line 818. This reverse flow of fluid in the line 818 is prevented by operation of the check valve 817. To alleviate this condition, a relief circuit is provided. At this time, the constant pressure supplied to the line 818 will flow through a relief valve 819 and a connected line 820 to the return line 760. The relief valve 819 is set to open at a pressure which is slightly greater than the constant pressure supplied to the line 818. Therefore, as the table base 57 is moved downwardly by operation of the table base transmission, the constant pressure in the chambers 504 and 504L tend to resist downward movement of the pistons 498 and 498L, respectively, to prevent the table base from overrunning its transmission. Thus, a constant pressure is supplied to the chambers 504 and 504L irrespective of the position of the table base 57 so that the weight of the table base, the rotary table 60 and the drive transmission for driving the table 60, as well as, the table drive motor 75, is always supported by the counterbalance mechanisms 491 and 492 irrespective of the position of the table base. As a result, this substantial weight is never placed upon the table base drive transmission but is always carried by the counterbalance mechanisms 491 and 492.

As previously mentioned, the work supporting table 60 is rotatably driven by the hydraulic motor 75. The table drive motor 75 is under the control of the servo valve 465 which is connected to receive fluid pressure by operation of a solenoid actuated valve 825. With a valve spool 826 of the solenoid valve 825 biased into its leftward position, as shown, the servo valve is connected via a line 827 and a passage 828 formed in the valve spool 826 to the main return line 760. Energization of a solenoid 829 effects rightward movement of the valve spool 826, connecting the main pressure line 758 to the line 827 via a passage 830 formed in the valve spool. Fluid pressure in the line 827 will flow to the servo valve and by operation of the servo valve, according to operational control signals obtained from the tape reader 885, will be directed into a line 831 and flow therefrom to the fluid motor 75 for effecting its operation for rotating the table 60 in a clockwise direction. For controlling the rate of rotation for the motor 75, the flow of fluid from the motor 75 is directed back through the servo valve via a line 832 where the servo valve will operate to meter the flow of the exhaust fluid therethrough and direct the fluid into a line 833 connected to the main return line 760. Should the operation of the servo valve be such as to direct the fluid pressure into the line 832, the fluid pressure to the motor 75 will effect its operation in a direction to effect rotation of the table 60 in a counterclockwise direction. Under this condition the exhaust fluid from the motor 75 will flow into the line 831 to return to the servo valve 465 whence it is metered to control the rotation of the motor 75 and discharged into the return line 833 connected to the main return line 760.

While the description given for effecting the movement of the five major elements have been presented from a standpoint of individual operation, it should be noted that the solenoids 766, 778, 790, 811 and 829 of the valves 762, 774, 786, 810 and 825, respectively, are all energizable simultaneously upon a signal obtained from a source such as the punched tape previously mentioned. However, the solenoid 803 of the valve 804 associated with the locking mechanisms 508 and 509 is energized only when the solenoid 799 of the valve 795 associated with the table base motor 70 is energized. The signal for energizing the solenoids 799 and 803 is also obtained from the tape reader 885.

Figure 13:
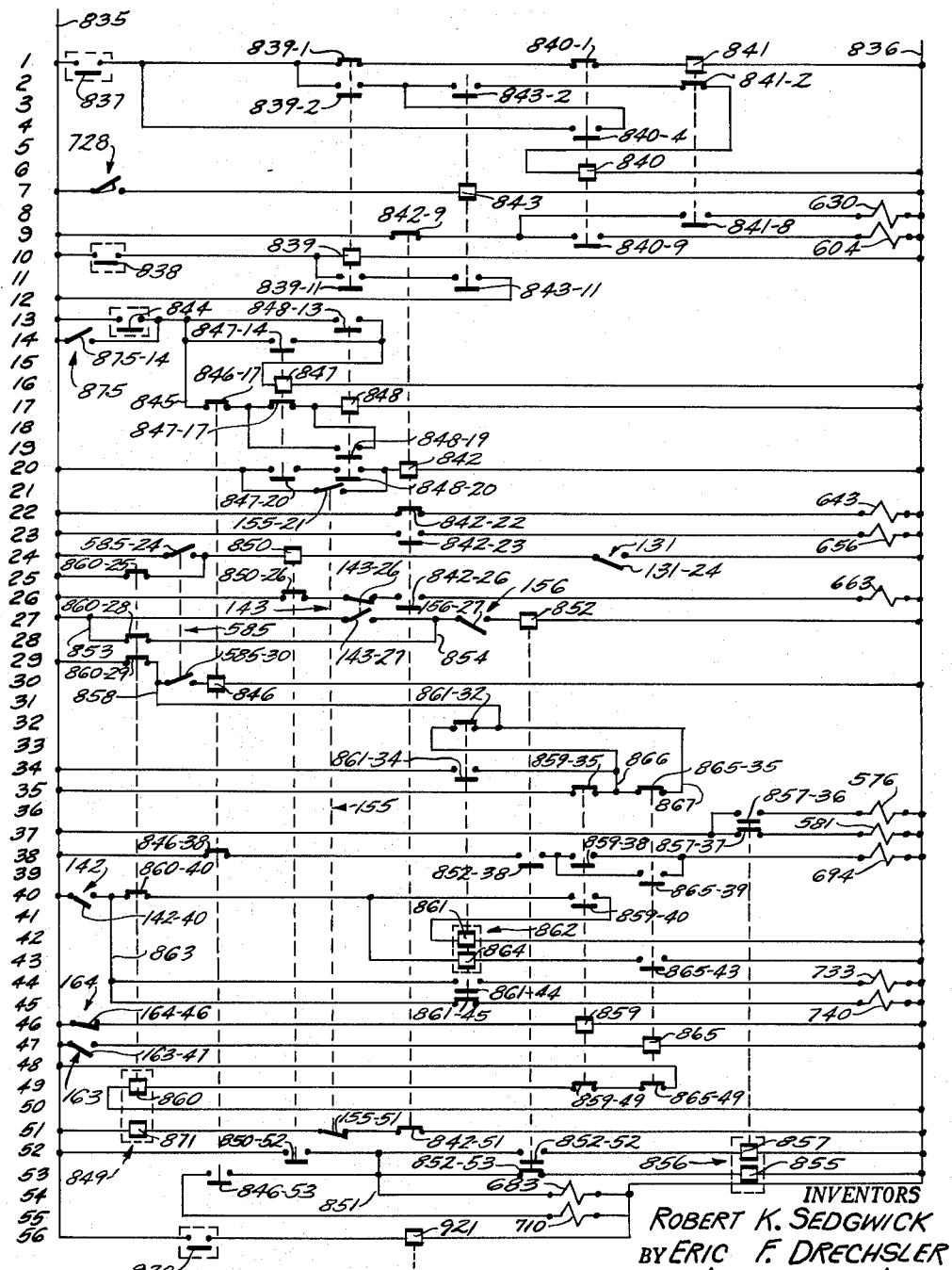
FIG. 13 is a schematic diagram showing a portion of the electrical control circuit for effecting a tool change.

The electrical control circuit for effecting rotational movement of the tool storage magazine 82 for advancing a particular preselected tool into the tool change ready station, as shown in FIGS. 1 and 2, is schematically represented in FIG. 13. As therein shown, the various horizontal control conductors are designated from 1 to 56, inclusive, and are operatively interconnected between energized control conductors 835 and 836. The energized control conductors 835 and 836 are connected to be energized by a source of power by actuating switching means [not shown] in a well known manner. The various relay coils are identified by a reference numeral while their associated contacts are identified by the coil identifying reference numeral followed by the horizontal conductor reference numeral in which they appear. As hereinbefore explained with reference to FIGS. 1 and 11, the switch actuating fingers 117 carried by the retractable switch mechanism 118 are operated in code fashion by the coded collar 119 associated with each of the tool holders. The arrangement for providing a coded input signal together with the coded actuation of switch fingers 117 by the appropriate coded collar 119 is fully explained in the aforementioned U.S. Patent 3,052,011 issued to Brainard et al. Thus, it is not deemed necessary to fully explain the coincidence circuit required for actually stopping movement of the indexable tool storage magazine 82 in the present application. It is deemed sufficient to state that a binary coded number is impressed on the control system by operation of the tape reader 885 to indicate the next required tool to be advanced into the tool change ready station. The next selected tool is provided with a coded collar 119 having alternate grooves and rings disposed to provide a binary signal. Thus, during rotational movement of the magazine to select the designated tool, the coded collar associated with that tool so actuates the switch fingers 117 as to impress a binary coded signal upon the control system that coincides with the tape input signal. Upon establishment of coincidence of the binary coded signal caused by actuating the switch fingers with the binary coded signal from the tape, rotation of the magazine stops.

At the start of any tool selecting movement of the magazine 82, it will be apparent that the coded switch actuating mechanism 118 represented in FIGS. 1 and 11, is in an outward operating position in a manner that the actuating switch fingers 117 will impinge upon the circular path of travel of the coded collars 119 as they are rotated bodily by the magazine 82. Further, as hereinbefore explained, it will be recalled that the tool selecting movement of the storage magazine 82 is initiated during some other machine function, such as an actual machining operation.

Referring now to FIG. 13, a normally open contact 837 in line 1 is closed in response to a signal from the tape reader 885 to initiate rotatable movement of the storage magazine. Subsequently, a normally open contact 838, in line 10, is closed upon movement of the preselected tool into the tool change ready station, thereby completing the tool code coincidence circuit to stop rotation of the tool storage magazine. In other words, a coded input signal from the control tape affects closure of the normally open contacts 837 in line 1, to initiate rotatable movement of the tool storage magazine. Upon arrival of the preselected tool in the tool change ready station, a coincidence circuit initiated by the coaction of switch fingers 117 with an appropriate coded collar 119 of the preselected tool effects closure of the normally open contact 838 in line 10 and thereby energizes the coil of a relay 839.

Upon closure of normally open contact 837 in response to a tape signal, a circuit from the energized conductor 835 is completed along line 1, and thence through a normally closed contact 839–1 of deenergized relay 839 and thence through a normally closed contact 840–1 of a deenergized relay 840 to the coil of the relay 841 to energize the coil, with the circuit being completed to the energized conductor 836. With the coil of the relay 841 energized, an associated normally open contact 841–8 is moved to closed position to effect energization of the solenoid 630. This circuit for energizing the solenoid 630 is established from the energized conductor 835 along line 9, through a normally closed contact 842–9 to line 8, and thence through the now closed contact 841–8 of the energized relay 841 to the solenoid 630 of the valve 600. With the solenoid 630 of the valve 600 energized, fluid pressure will be directed to the magazine motor 115 to effect its operation for rotating the magazine 82 in a tool selecting operation. To preclude the energization of both of the solenoids of the valve 600, a normally closed contact 841–2 is moved to an open position as the coil of the relay 841 is energized, thereby precluding the energization of the coil of the relay 840 that is associated with the energization of the solenoid 604 of the valve 600. With the solenoid 630 of the valve 600 energized, the tool storage magazine 82 is rotated in a counterclockwise direction, as viewed in FIG. 1, until the next selected tool, as determined by the binary coded signal from the control tape, is moved into the tool change ready station. As the magazine starts to rotate, the roller 625 is retracted from the cam plate 626 to release the switch 728. The release of the switch 728 causes it to close its contact, shown in line 7, to complete a circuit for energizing the coil of a relay 843. Energization of the coil of the relay 843 causes it to close two associated normally open contacts 843–2 and 843–11 to partially condition other circuits for subsequent operation.

As soon as the selected tool reaches the tool change ready station, the tool coincidence circuit [not shown] operates to effect closure of the normally open contact 838 in line 10, to complete the circuit along line 10 to the coil of the relay 839. This circuit is established from the energized conductor 835 through the now closed contact 838 in line 10, along the line to the coil of the relay 839, and thence to the energized conductor 836, for energizing the coil of the relay. With the coil of the relay 839 energized, it will operate to move its associated normally closed contact 839–1 to an open position and will also operate to move its normally opened contact 839–2 to a closed position. Consequently, the circuit to the coil of a relay 841 in line 1 is deenergized to preclude counterclockwise rotation of the magazine 82. Upon this occurrence, its associated contact 841–2 is returned to its normally closed position and its normally open contact 841–8 is also returned to its normally opened position to interrupt the circuit to the solenoid 630 of the valve 600. This serves to establish a circuit for energizing the coil of the relay 840 associated with the clockwise positioning movement of the magazine 82. Such circuit is established from the energized conductor 835 through the now closed contact 837 in line 1, through the now closed contact 839–2, the now closed contact 843–2 and the closed contact 841–2 to the coil of the relay 840 with the circuit being completed to the energized conductor 836.

With the coil of the relay 840 energized it will operate to move an associated normally open contact 840–9 to a closed position thereby establishing a circuit for energizing the solenoid 604 of the valve 600. Such circuit is established from the energized conductor 835 along line 9 through the normally closed contact 842–9 of deenergized relay 842 and thence through the now closed contact 840–9 of the relay 840 to the solenoid 604 with the circuit being completed to the energized conductor 836. It will be recalled that as fluid pressure is supplied to the motor 115 for effecting counterclockwise rotation of the tool storage magazine in a tool selecting operation the fluid pressure was also sequenced to the cylinder 613 for retracting the roller detent cam 625. Thus, as the solenoid 630 of the valve 600 is deenergized, returning the valve spool 611 to its central neutral blocking position for stopping rotation of the motor 115 and thereby positioning the tool storage magazine 82 slightly beyond the desired location of the selected tool, the pressure to the cylinder 613 is discontinued also so that the cam 625 is moved back to engage the periphery of the cam plate 626. Therefore, when the solenoid 604 of the valve 600 is energized to effect clockwise rotation of the magazine 82 for precise positioning of the selected tool in the tool ready station, the cam roller 625 will be riding on the periphery of the cam plate and until such time as the cam roller 625 enters the detent notch. At this time the switch 728 will be actuated to open its contact in line 7 thereby deenergizing the coil of the relay 843. Upon this occurrence its associated contact 843–2 is moved to its normally open position thereby interrupting the circuit to the clockwise positioning relay 840. With the coil of the relay 840 deenergized it will operate to move its contact 840–9 to its normal open position thereby interrupting the circuit that was established for energizing the solenoid 604 of the valve. Thus, the valve spool 611 of the valve 600 is returned to its central neutral blocking position as shown in FIG. 11 to discontinue the fluid pressure to the motor 115 thereby stopping the rotation of the magazine 82 and precisely positioning the selected tool at the tool change station.

When the cam roller detent 625 engaged the detent groove 627 of the cam plate 626, the switch 728 was actuated to move its contact shown in line 7 to an open position as previously stated. This, then, interrupted the circuit to the coil of the relay 843 so that its contact 843–11 is moved to its normally open position to interrupt a temporary circuit for maintaining the coil of the relay 839 energized. The temporary circuit for maintaining the coil of the relay 839 energized was established from the energized conductor 835 along line 12, through the then closed contact 843–11 and the closed normally open contact 839–11 to line 10 and thence through line 10 to the energized conductor 836. This circuit was established for maintaining the coil of the relay 839 momentarily energized after the preselected tool had been moved into a tool change ready station. Thus, after the coincidence circuit contact 838 returns to its normally open position, and the coil of the relay 843 is deenergized, both the primary energizing circuit and the momentary maintaining circuit for the coil of the relay 839 are interrupted to preclude energization of the clockwise rotating relay 840.

It will now be assumed that the proper preselected tool has been moved into the tool change ready station and the spindle head 43 has been moved along the "X" and "Y" axes to the spaced apart tool change station relative to the tool change mechanism 80, as shown in FIG. 1, and also that the saddle 56 has been moved away from the column a preselected distance so that a workpiece on the rotary table will not interfere with the operation of the tool change member 107. The tool change mechanism 80, FIG. 1, is then operable to interchange the drill 49 carried by the spindle 47 with the milling cutter 81 carried by storage magazine 82. With these conditions having been established, the tool change is effected in response to a single input signal from the control tape or storage medium. As shown in FIG. 13, operation of the tool change member is initiated by closure of a normally open contact 844 in line 13, in response to a signal from the tape reader 885. Upon closure of the contact 844, a circuit is completed along line 13 to a vertical conductor 845 and thence along line 17 through a normally closed contact 846–17 of a deenergized relay 846 and through a normally closed contact 847–17 of a deenergized relay 847 to the coil of a relay 848 in line 17 with the circuit being completed to the energized conductor 836.

Energization of the coil of the relay 848 immediately effects closure of a normally open contact 848–19 to by-pass the normally closed contact 847–17 from line 17 via line 19 through the now closed contact 848–19 and back to line 17 to complete a holding circuit around the contact 847–17 which serves to maintain the relay 848 energized when the coil of the relay 847 is energized. At the same time, energization of the coil of the relay 848 effects closure of another normally open contact 848–13, completing a circuit along line 13 through the now closed contact 848–13 to line 16 and thence to the coil of the relay 847 with the circuit being completed along line 16 to the energized conductor 836. As this occurs, the normally closed contact 847–17 is moved to an open position. However, at this time, the coil of the relay 848 is maintained energized through the holding circuit established by the closure of the contact 848–19 as previously described. The energization of the relay 847 also operates to effect the closing of an associated normally open contact 847–14 to establish a circuit around the contact 848–13 to establish a circuit for maintaining the relay 847 energized upon subsequent deenergization of the relay 848.

At this moment, the tool grips 108 and 109 are both retained in retracted position within the hollow housing of the tool change member 107. With this condition existing, the dog 154 is positioned to actuate the switch 155, shown in FIG. 11. With the switch 155 actuated, a contact 155–21 thereof in line 21 of FIG. 13, is in an open position. Upon energization of the relay coils 847 and 848 in lines 16 and 17 respectively, in response to the tape signal, the associated normally open contacts 847–20 and 848–20 in line 20 are moved to closed positions to complete a circuit along line 20 to energize the coil of the relay 842, with the circuit being completed to the energized conductor 836. Energization of the coil of the relay 842 effects movement of associated normally closed contact 842–9 to an open position to preclude energization of either the solenoid 630 or the solenoid 604 of the valve 600 during a tool changing cycle. Since the solenoids 604 and 630 are operative to effect movement of the tool storage magazine 82, this arrangement prevents the rotation of the magazine during the tool change operation.

Upon energization of the coil of the relay 842, associated contacts 842–22 and 842–23 are moved to open and closed positions respectively. Consequently, the solenoid 643 in line 22 associated with the valve 638 is deenergized and a solenoid 656 in line 23 associated with the valve 639 is energized to effect the retraction of the code actuating mechanism 118, shown in FIG. 11. With the switch mechanism 118 pivotably retracted, the switch fingers 117 carried thereby are retracted from engagement with the coded rings carried by the tool collar to permit subsequent axial withdrawal of the tool holder carrying the drill 49 from the spindle 47.

Upon movement of the switch mechanism 118 to fully retracted position, the switch 131 is actuated thereby moving its associated contact 131–24 in line 24 to a closed position. A circuit is then completed from the energized conductor 835 along line 25 through a normally closed contact 860–25 to line 24 and thence to the coil of a relay 850 shown in line 24. The circuit continues along line 24 through the now closed contact 131–24 of the switch 131 with the circuit being completed to the energized conductor 836. It will be recalled that whenever the collet 852, shown in FIG. 10, is in clamped engagement with a tool holder, the switch 585 is actuated. With the switch 585 actuated an associated contact 585–24 in line 24 is moved to an open position. Thus, the initial circuit for energizing the coil of the relay 850 is established through the normally closed contact 860–25 of a deenergized latch relay 849 until such time as the collet is moved to an unclamped condition. Upon energization of the coil of the relay 850 an associated normally closed contact 850–26 in line 26 is moved to open position thereby interrupting the circuit to the solenoid 663 shown in line 26 permitting the valve spool 664 of the valve 661 to be biased into its leftward position as shown in FIG. 11. The solenoid 663 was energized at the time that the coil of the relay 842 was energized which operated to close its normally open contact 842–23 thereby establishing a circuit along the line 26 through the normally closed contact 850–26 and through the closed contact 143–26 of actuated limit switch 143 and through closed contact 842–23 to the solenoid 663. Thus, energization of the coil of the relay 850 will operate to effect deenergization of this solenoid. As the normally closed contact 850–26 is moved to an open position, another associated normally open contact 850–52 in line 52 is moved to a closed position. This will complete a circuit from the energized conductor 835 along line 52 through the now closed contact 850–52 to a vertical conductor 851 and thence along line 54 to the solenoid 683 with the circuit being completed to the energized conductor 836. With the solenoid 683 energized, the valve 662 is conditioned to supply fluid pressure to the tool grip actuator 145 for effecting its operation in a direction to extend the tool grips 108 and 109 into engagement with tools as hereinbefore described.

Whenever the carriage 106 is in its inward or retracted position, the dog 141, shown in FIG. 11, is positioned to actuate the switch 143. Thus, a contact 143–27 thereof in line 27 is moved to the open position, as shown in FIG. 13. On the other hand, when the two grips are moved into extended gripping position, the limit switch 156 will be actuated to move its contact 156–27 shown in line 27 to a closed position. Thus, a circuit is completed from the energized conductor 835 along line 27 to a vertical conductor 853 and thence along line 28 through the closed contact 860–28 to a vertical conductor 854 and thence through the now closed contact 156–27 of the actuated limit switch 156 to the coil of the relay 852 with the circuit being completed to the energized conductor 836.

Energization of the coil 852, in line 27, will operate associated normally open contact 852–52 and normally closed contact 852–53 to closed and open positions respectively. Opening of the contact 852–53 operates to interrupt a circuit to the unlatching coil 855 in line 53 of a latch relay 856. With the contact 852–53 now in open position, the associated contact 852–52 after a slight delay is moved to a closed position thereby completing a circuit along line 52. Inasmuch as the coil of the relay 850 in line 24 has been previously energized its associated contact 850–52 in line 52 is moved to a closed position. Thus, a circuit is completed from the energized conductor 835 along the line 52 through the now closed contact 850–52 and thence through the now closed contact 852–52 to a latching coil 857 of the latch relay 856 with the circuit being completed to the energized conductor 836. Upon energization of the latching coil 857 of the latch relay 856, associated contacts 857–36 and 857–37 are moved from their normally open and normally closed positions, respectively, to closed and opened positions respectively. Opening of the contact 857–37 operates to interrupt the circuit to the solenoid 581 of the control valve 563 associated with the collet actuating mechanism. This will condition the valve 563 so that the valve spool 570 may be positioned for directing fluid pressure to the collet actuating mechanism to move the collet 52 to unclamped position. With the contact 857–37 moving to its open position the associated contact 857–36 is moved to a closed position to complete a circuit from the energized conductor 835 along line 37 to line 36 and thence through the now closed contact 857–36 to the solenoid 576 and thence to the energized conductor 836. Energization of the solenoid 576 operates to position the valve spool 570 of the valve 563 for directing fluid pressure to the collet actuating mechanism for releasing the collet 52, as previously described.

When the collet 52 is unclamped, the switch 585, as shown in FIG. 10, is released. With the switch 585 released, its contact 585–30, in line 30, is moved to a closed position for completing a circuit for operating a relay 846. The circuit is completed from the energized conductor 835 along line 29 through a normally closed contact 860–29 of a deenergized latch relay 849 to a vertical conductor 858 and thence through the now closed contact 585–30 of the released limit switch 585 to the coil of the relay 846, with the circuit being completed along line 30 to the energized conductor 836. The energized relay 846 is operative to effect bodily movement of the tool carriage 106 and the tool change member 107 to its extended position for withdrawing the tools respectively carried by the storage magazine and tool spindle. It should be noted that a plurality of overlapping circuits are provided along lines 29 to 35, inclusive, for retaining the relay coil 846 energized during the required portion of the tool change cycle.

When the collet 52 is being actuated in an unclamping operation, the limit switch 164 is actuated, because at this time the tool change member 107, in the position shown in FIGS. 1 and 11, has not as yet been rotated 180° in a first cycle of tool interchange. However, after the first cycle of tool interchange is completed, the tool change member 107 will be positioned 180° from the position shown in FIGS. 1 and 11. In this case the limit switch 163 will be actuated when the collet 52 is being unclamped.

Assuming now that the collet 52 is being unclamped prior to the first cycle of tool interchange operation, the limit switch 164 is actuated and its associated contact 164–46 will be closed, as shown in line 46 of FIG. 13. Thus, this completes a circuit from the energized conductor 835 along line 46 through the closed contact 164–46 of the actuated limit switch 164 and thence along the line 46 to the solenoid of a relay 859 with the circuit being completed to the energized conductor 836. Consequently, associated contacts 859–35 and 859–49 are moved to open positions. With the contact 859–49 in open position, a circuit from the energized conductor 835 along the line 48 and the lines 49 and 50 is interrupted to maintain a latching coil 860 of the latch relay 849 deenergized. Since the latching coil 860 is deenergized, the associated contact 860–29 in line 29 is retained in its normally closed position so that the circuit for energizing the coil of the relay 846 may be completed upon the actuation of the limit switch 585 when the collet 52 is unclamped.

The coil of the relay 846 is initially energized through the circuit completed upon actuation of the limit switch 585, since a circuit along line 34 cannot be completed because the contact 861–34 of a deenergized latching coil 861 of a latch relay 862 is deenergized and the contact is retained in its normally open position. Also, at this time, a circuit cannot be completed along line 35 through a normally closed contact 859–35 therein because the coil of the relay 859 with which the contact 859–35 is associated is energized and the contact 859–35 is now in open position. With the coil of the relay 846 energized, it will operate to move an associated normally closed contact 846–38 to open position, thereby interrupting a circuit along line 38 to deenergize the solenoid 694 of the valve 695, shown in FIG. 11, that operates to retain the carriage 106 in a retracted position. At the same time, another associated normally open contact 846–53 is moved to a closed position to complete a circuit for energizing a solenoid 710 of the valve 708 which controls the advancing movement of the carriage 106. Such circuit is established from the energized conductor 835 along line 52 through now closed contact 850–52 to a vertical conductor 851 and thence along the line 53 and through the now closed contact 846–53 to the line 55 and thence to the solenoid 710 with the circuit being completed to the energized conductor 836. Energization of the solenoid 710 operates to actuate the valve 708 for effecting advancing movement of the carriage 106 to move the tool change member 107 therewith, as previously described. When the carriage 106 is fully advanced, the limit switch 164 is still actuated to retain its contact 164–46 closed until such time as the rotation of the tool change member is initiated to reverse the position of the tool change arms from the position shown in FIG. 11, to a position which is 180° reversed therefrom. As soon as the carriage 106 has been advanced a distance sufficient to permit pivotal movement of the tool change member 107, the dog 141 will actuate the limit switch 142. With the limit switch 142 actuated, its associated contact bar 142–40, shown in line 40, is moved to a closed position.

Inasmuch as the tool change member 107 is still in the position shown in FIG. 11, the switch 164 is maintained actuated so that its associated contact 164–46 is retained in a closed position thereby retaining the coil of the relay 859 energized. Consequently, the associated normally closed contact 859–49 in line 49 is maintained in an open position to keep the latching coil 860 of the latch relay 849 deenergized and the associated contact 860–40 in its normal closed position. With the coil of the relay 859 energized, an associated contact 859–40 in line 40 is in closed position to complete a circuit from the energized conductor 835 along the line 40 through the closed contact 142–40 of actuated limit switch 142, through the normally closed contact 860–40 of the deenergized latching coil 860 and thence along line 40 and through the now closed contact 859–40 to line 41. The circuit continues along lines 41 and 42 to the latching coil 861 of the latch relay 862 shown in line 42, with the circuit being completed from the coil 861 to the energized conductor 836. Since the coil 861 is the latching coil of the latch relay 862, the associated contacts actuated by the energization of the coil 861 will remain in their actuated positions even though the coil 861 is deenergized until the unlatching coil 864 in line 43 of the relay 862 is energized. Upon energization of the latching coil 861, associated contacts 861–44 and 861–45 are respectively moved to closed and open positions. Thus, upon movement of the normally closed contact 861–45 to open position, a circuit from the energized vertical conductor 863 is interrupted thereby deenergizing the solenoid 740 of the valve 732 which is operative to retain the tool change member 107 in the position shown in FIG. 11. At the same time, the movement of the normally open contact 861–44 to closed position completes a circuit from the energized vertical conductor 863 along the line 44 through the now closed contact 861–44 to the solenoid 733 with the circuit being completed to the energized conductor 836. Energization of the solenoid 733 associated with the valve 731 will effect the operation of the motor 161 to pivot the tool change member 107, 180°. As the tool change member 107 is being pivoted 180°, the limit switch 164 is released, and upon completion of the pivotal movement of the tool change member, the limit switch 163 is actuated.

Upon arrival of the tool change member 107 into the position wherein the tool change grips 108 and 109 are 180° reversed from the position shown in FIG. 11, the entire tool change member 107 and the carriage 106 is again moved rearwardly to insert the interchanged tools into the storage magazine and tool spindle. Since the limit switch 164 is deactuated, as previously mentioned, its contact 164–46 is moved to its normally open position to effect deenergization of the coil of the relay 859. Deenergization of the coil of the relay 859 causes its associated contact 859–40 in line 40 to be moved to its normally open position to deenergize the latching coil 861 of the latching relay 862. However, deenergization of the latching coil 861 will not affect contacts of the latch relay 862 since the unlatching coil 864 of the relay 862 has not been energized. Deenergization of the coil of the relay 859 also causes its associated contact 859–49 to be returned to its normally closed position. This results in a circuit being established from energized conductor 835 along line 48, through a normally closed contact 865–49 in line 49 of a deenergized relay 865, and thence through the normally closed contact 859–49 to the latching coil 860 of the latch relay 849, with the circuit being completed along the line 50 to the energized conductor 836.

When the pivotal movement of the tool change member 107 is completed to interchange the position of the tools, the dog 165, shown in FIG. 11, is positioned in actuating engagement with the limit switch 163. As this occurs, its associated contact 163–47 in line 47 of FIG. 13, is moved to closed position, completing a circuit from the energized conductor 835 along the line 47 to the coil of the relay 865 and thence to the energized conductor 836. Energization of the relay 865 operates to move an associated normally closed contact 865–49 in line 49 to open position, thereby interrupting the circuit to the latching coil 860 of the latch relay 849. However, at this time, deenergization of the latching coil 860 has no effect on the condition of its associated contacts which will remain actuated until a cooperating unlatching coil 871 of the latching relay 849 is energized.

Prior to the energization of the coil of the relay 865, in line 47, in response to actuation of limit switch 163, a circuit to maintain the coil of the relay 846 in line 30 in energized condition, was established through an associated normally closed contact 865–35 in line 35. Also, prior to the energization of the coil of the relay 865, the latching coil 860 of the latch relay 849, the latching coil 861 of the latch relay 862 in line 42, the coil of the relay 859 in line 42, and the coil of the relay 859 in line 46, were deenergized. Thus, immediately prior to the energization of the coil of the relay 865 in line 47 energizing circuits for maintaining the coil of the relay 846 in line 30 energized, were completed along lines 30 to 35, inclusive, to a vertical conductor 866. The circuit along line 29 to vertical conductor 858 is interrupted at this time due to the movement of the normally closed contact 860–29 to open position by reason of the latching coil 860 of the latch relay 849 having been previously energized. Likewise, the circuit from the vertical conductor 866 along the lines 33 and 32 through a normally closed contact 861–32 to the conductor of line 31 is interrupted due to the movement of the normally closed contact 861–32 to open position by reason of the prior energization of the latching coil 861 of the latch relay 862, the coil of which appears in line 42. Therefore, the circuit for maintaining the coil of the relay 846 in line 30 energized is now completed along line 35 via normally closed contact 859–35 and normally closed contact 865–35 to the vertical conductor 867 and thence along line 32 to the line 31 and then by means of the vertical conductor 858 and the now closed contact 585–30 of the limit switch 585, to the coil of the relay 846 and thence to the energized conductor 836.

At this time, therefore, energization of the coil of the relay 865 in line 47 affects movement of the associated normally closed contact 865–35 to open position, interrupting the circuit to the vertical conductor 867 and effecting the deenergization of the coil of the relay 846. Deenergization of the coil of the relay 846 operates to move its associated contact 846–53 to its normally open position thereby interrupting the circuit therethrough to effect deenergization of the solenoid 710 of the valve 708. With the solenoid 710 deenergized, a circuit is established along line 38 for energizing the solenoid 694 of the valve 695 for effecting the retraction of the carriage 106.

This circuit for energizing the solenoid 694 in line 38 is completed from the energized conductor 835 along line 38 via the normally closed contact 846–38 and thence via a now closed contact 852–38 of the energized relay 852 in line 27, to line 39. The circuit continues along line 39 through the now closed contact 865–39 of energized relay 865 back to line 38 and thence to the solenoid 694 with the circuit being completed to the energized conductor 836. Referring to the coil of the relay 852 in line 27, it will be recalled that the circuit for retaining this relay energized had been completed along line 27, via the vertical conductor 853, the normally closed contact 860–28 in line 28 and the vertical conductor 854. This circuit continued along line 27 and through the closed contact 156–27 of the actuated limit switch 156, which has been actuated upon the extension of the tool grips, as previously described, to the coil of the relay 852 with the circuit being completed to the energized conductor 836. However, with the carriage 106 in outward position, this circuit is completed directly along the line 27 via the normally closed contact 143–27 of the limit switch 143, which has been released by the advancing movement of the carriage 106 moving the dog 141, shown in FIG. 11, out of engagement with the switch.

Upon energization of the solenoid 694 in line 38, the valve 695 is conditioned to effect the return movement of the carriage 106 as previously described. The retracting movement of the carriage 106 serves to insert the interchanged tools into the storage magazine and the tool spindle. When the carriage 106 is fully retracted, the dog 141 is positioned to engage the limit switch 143, shown in FIG. 11, so that its associated contact 143–27 in line 27 is moved to open position while another associated contact 143–26 in line 26 is moved to closed position. When the contact 143–27 is opened, the circuit along line 27 is interrupted to effect deenergization of the coil of the relay 852. With the coil of the relay 852 deenergized its associated contact 852–53 in line 53 is moved to its normal closed position to complete a circuit along line 53 to the unlatching coil 855 of the latch relay 856 and thence to the energized conductor 836. The energized unlatching coil 855 operates to affect a return movement of the contacts associated with the latching coil 857 to their normal positions. This occurs because a contact 852–52 in line 52 is moved to its open position to interrupt the circuit to the latching coil 857 of the latch relay 856 to deenergize this coil. As a result, when the unlatching coil 855 is energized, the contacts associated with the latching coil 857 are returned to their normal positions. As this occurs, the contact 857–36 in line 36 is returned to its normal open position, effecting deenergization of the collet unclamping solenoid 576. Simultaneously therewith, a contact 857–37 in line 37 is returned to its normal closed position to complete a circuit along the line 37 to the collet clamp solenoid 581 so that the collet clamp mechanism shown in FIG. 10 is actuated to move the collet 52 in clamping engagement with a tool holder that has been inserted in the spindle 47.

Upon the return movement of the switch contact 143–26 to a closed position, a circuit is again completed along line 26 to energize the solenoid 663 for effecting the retraction of the tool grips 108 and 109 into the tool change member 107. Movement of the tool grips to retracted position will operate to move the dog 154 shown in FIG. 11 into engagement with the limit switch 155. As this occurs, its contact 155–51 in line 51 of FIG. 13, is returned to its closed position, completing a circuit along the line 51. Such circuit is established from the energized conductor 835 along line 51, through the unlatching coil 871 of latch relay 849, thence along line 51 through the now closed contact 155–51 of the limit switch 155, thence through the normally closed contact 841–51 of deenergized relay 842 to the conductor 836. This circuit energizes the unlatching coil 871 of the latch relay 849 to permit the contacts associated with the latching relay 860 to return to their normal conditions, as shown, by reason of the fact that the latching coil 860 had previously been deenergized.

Prior to the energization of the unlatching coil 871, the contact 156–27 of the limit switch 156 is released to open position, because the dog 154 moved out of engagement with the limit switch 156 and into engagement with the limit switch 155. This conditions the circuit for subsequently affecting deenergization of the coil of the relay 842 in line 20 upon movement of the tape control contact 844 to its normal open position when the tool changing function is completed. As this occurs, the coil of the relay 847 and the coil of the relay 848 in lines 16 and 17, respectively, are deenergized to effect deenergization of the coil of the relay 842, thereby effecting the return movement of the associated contact 842–51 to its normal closed position. With the contact 842–51 in its normal closed position energization of the unlatching coil 871 of the latch relay 849 will occur. Upon the deenergization of the relay 842, the interchange of tools has been completed and the collet clamp has been returned to engaged position to secure the preselected tool in the spindle for the next machining operation.

During an automatic tool change cycle in response to a tape control signal, the contact 844 in line 13 is retained in its closed position until the complete interchange of tools has been effected. Tool interchange can be effected by a manually initiated means, as well as automatically, in response to tape control. To accomplish this, a push button switch 875 in line 14 is depressed manually to close its contact 875–14 to complete a circuit from the energized conductor 835 along line 14 via the closed contact 875–14 of the push button switch 875 to the vertical conductor 845 and thence along line 13, as hereinbefore described.

Figure 14:
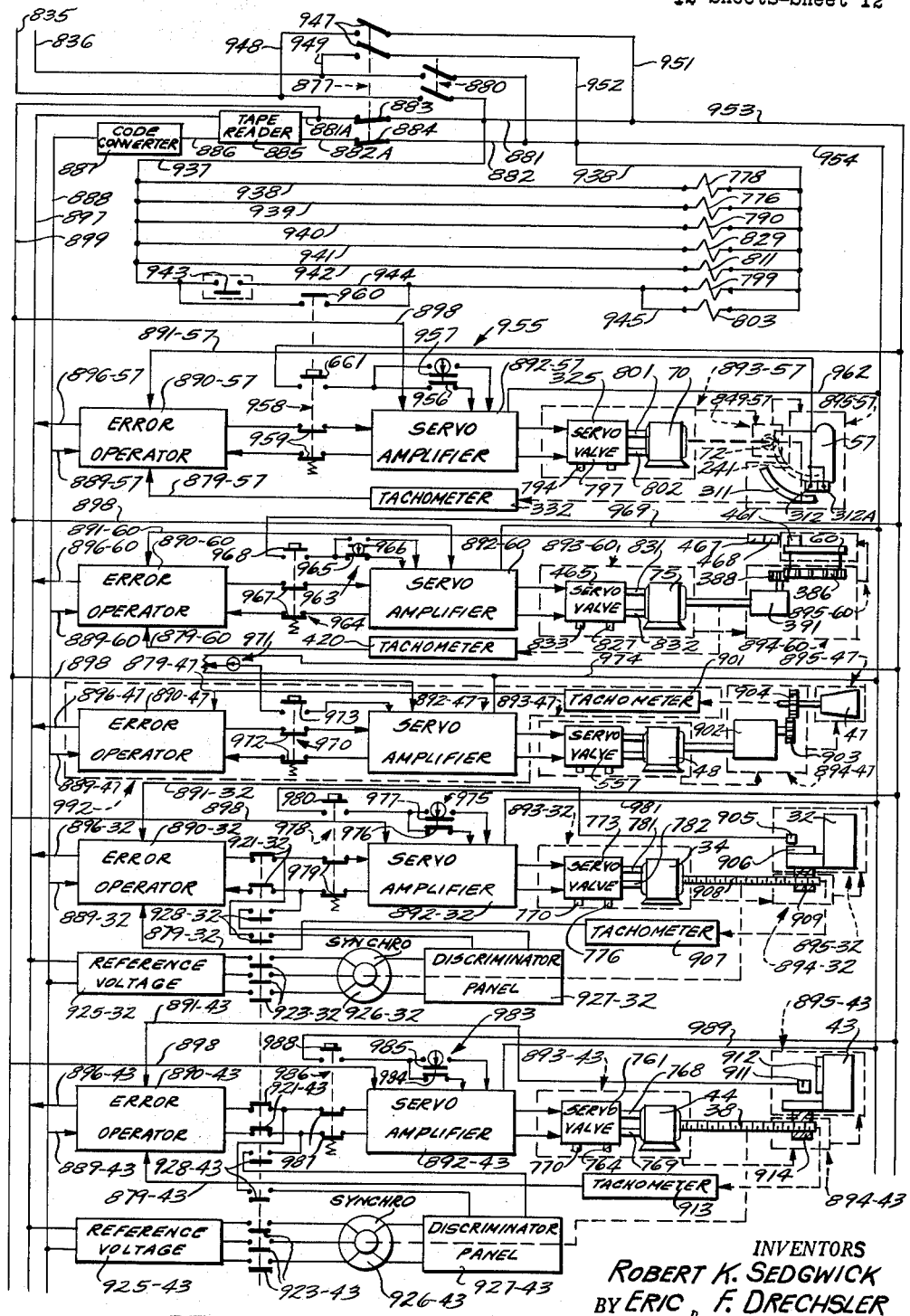

To effect bodily movement of the movable members along the five axes, there is provided a tape control system schematically shown in FIGS. 14 and 14A. As there shown, closure of a switch 880 connects energized conductors 835 and 836 to conductors 881 and 882 respectively. Energized conductors 881 and 882 are connected to energize a tape reader 885 via a pair of contacts 883 and 884 which are normally closed and operate to permit the flow of current from the energized conductors 881 and 882 to conductors 881A and 882A respectively, which are connected to the tape reader 885. The tape reader 885 is operative in a well known manner to transmit output signals from a coded punched tape 878, shown in FIG. 1, to an output conductor 886 that is connected between the tape reader and a code converter 887. The tape reader 885 is adapted to transmit digital information from the moving tape 878 to effect movement of the movable members, as well as supplying, where required, the signals for effecting indexable movement of the tool storage magazine to preselect the next tool, and provide a signal for initiating a tool change cycle.

As well known in the art, the tape reader 885 is provided with a plurality of switches operative in binary code form by means of switch plungers engaging appropriately spaced holes in a punched tape, as the tape is mechanically advanced relative to the reader. From the tape reader 885, the conductor 886 is operable to activate the code converter 887 disposed, in turn, to convert information from the tape code to decimal code. The code converter is also operative to store this information in registers in the form of sine-cosine voltage ratios for predetermined selected point-to-point positionings. Also, the code converter will convert information from the tape and store the information converted thereby for velocity control. In addition to converting and storing information relative to the five axes of movement, the code converter 887 is also operative to store information in binary code form relative to the required speed of the tool spindle; the selected index position of the rotatable tool storage magazine for preselecting a tool; and, for initiating a tool change cycle.

From the code converter 887, machine operating input signals are transmitted to a common trunk line 888 containing a plurality of branch conductors connected to different error operators.

To simplify the description, the branch conductors contained within the common trunk line 888 and their error operators have been respectively designated by common numerals 889 and 890, each being followed by an appropriate numeral suffix to indicate the particular major element which is being controlled. Branch conductor 889–57, for example, transmits information from the common trunk line 888 to activate the error operator 890–57 for supplying both positional and velocity control information for pivoting the table base 57 about the axis 58 which is the fourth axis of machine movement. The error operator 890–57 is operative to receive feed back information via lines 891–57 and 879–57, the lines being respectively connected to supply feed back information as to the position of the table base 57 about the fourth axis and information as to the velocity of the table base 57 as it is being pivoted about the fourth axis 58. To provide accurate position feed back information, the line 891–57 is connected to the position indicators or sensing heads 312 and 312A which are operatively associated with the table base, as shown in FIG. 7 and previously described. The sensing heads 312 and 312A are carried for movement relative to the cooperating scale 311 which is connected to be energized by means of supply conductors (not shown). The cooperative coaction between the sensing heads 312 and 312A, and the scale 311, provides an accurate feed back signal to indicate the position of the table base as it is being pivoted about the axis 58. The cooperating sensing heads 312 and 312A, and energizable scale 311, are schematically representative of well known commercially available units that are operative to sense the position of a movable member and produce a voltage which is supplied as position feed back information to an error operator, such as the error operator 890–57.

In a similar manner, in order to provide feed back information as to the velocity of the table base 57, as it is pivoted about the axis 58, the line 879—57 is connected to receive information from the tachometer 332 which is mechanically connected to be driven by the motor 70 as it operates to pivot the table base, as previously described with reference to FIG. 3. The error operator 890–57 operates to produce a voltage proportional to the magnitude of the error, as well as indicating the direction of positioning error. The voltage ratios stored in the code converter 887, irrespective of whether they are operative to obtain positional or velocity input signals, are compared to the corresponding voltages supplied from the scale 311 and sensing heads 312 and 312A and also the tachometer 332 to the error operator 890–57, with motion being stopped upon the occurrence of coincidence between the feed back supply and the code converter information.

From the error operator 890–57, command control information is transmitted to actuate a servo amplifier 892–57 which is directly connected to accurately control the velocity and extent of movement of a reversible power actuator 893–57. The power actuator 893–57 may comprise an electric motor or, as illustrated, the servo motor 70 hydraulically actuated by the servo valve 325, the motor 70 being connected to drive the transmissions 71 and 72. The transmissions 71 and 72, in turn, are connected to drive the racks 241 and 241L directly connected or secured to the pivotal table base 57, as previously described. The general arrangement for effecting movement of the table base 57 about the axis 58 is similar to that utilized for effecting the required rotational movement of the table 60 about its axis which constitutes the fifth axis of machine movement, the column 32 along the "X" axis, the spindle head 43 along the "Y" axis, and the saddle 56 along the "Z" axis, as well as rotational speed of the tool spindle 47.

As schematically represented in block diagram form in FIGS. 14 and 14A, the power actuator 893–57 is connected to drive a translating mechanism 894–57 which, in turn, is directly connected to a load 895–57, in this case represented by the table base 57. Actually, the translating mechanism 894–57 is represented as comprising the transmissions 71 and 72 and the racks 241 and 241L.

Each of the error operators designated by the common numeral 890, is connected to branch conductors 896. The branch conductors designated by the common numeral 896, are all connected to a trunk line 897, respectively connected to the tape reader 885. Thus, whenever a particular series of programmed movements of the members is completed, the error operators 890 are connected via the trunk line 897 to provide a signal to the tape reader 885 which is then operative to supply the subsequently utilizable control information. The signal from the trunk line 897 provides a signal to the tape reader for proceeding to the next block of information on the tape connected to effect machine movements. In a similar manner, the servo amplifiers designated by the common numeral 892 are connected via branch conductors 898 to a common energized line 899.

As hereinbefore explained, the various elements designated by common numerals in the block diagram of FIGS. 14 and 14A, are operative in similar manner to perform identical functions, although the placement of various of these elements is completely different in the associated machine structure, depending upon the particular structural component that it is associated with.

Thus, the conductor 889–60 transmits information from the trunk line 888 to activate the error operator 890–60 for supplying positional and velocity control information for rotating the table 60 about its own axis which constitutes the fifth axis of machine movement. The error operator 890–60 is operative to receive feed back information via lines 891–60 and 879–60, the lines being connected to supply feed back information as to the position of the table 60 and information as to the velocity of the table as it is being rotated about its own axis. To provide accurate position feed back information, the line 891–60 is connected to the position indicator or sensing heads 467 and 468 which are secured to the central flange 371 of the table base 57, as shown in FIG. 6 and previously described. The sensing heads 467 and 468 are positioned relative to a cooperating movable scale 461 which is secured directly to the bottom of the table center post 379 and connected to be energized by means of supply conductors (not shown). The cooperative coaction between the sensing heads 467 and 468 and the scale 461 provides an accurate feed back signal to indicate the position of the table as it is rotated about the fifth axis. The cooperating sensing heads 467 and 468 and energizable scale 461, which is similar to the scale 311 and sensing heads 312 and 312A, are schematically representative of well known, commercially available units, that are operative in the manner described, to supply position feed back information to the associated error operator 890–60.

To provide feed back information as to the velocity of the table 60 as it is rotated, the line 879–60 is connected to receive information from the tachometer 420 which is mechanically connected to be driven by the motor 75, as shown in FIG. 6, as it operates to drive the table 60. The error operator 890–60 operates to produce voltage proportional to the magnitude of the error, as well as indicating the direction of the position error. The voltage ratios and binary numbers stored in the code converter 887, irrespective of whether they are operative to obtain positional or velocity input signals, are compared to the corresponding voltages from the feed back conductors connected to the error operator 890–60, with motion being stopped upon the occurrence of coincidence between the feed back supply and the code converter information.

From the error operator 890–60, command control information is transmitted to actuate a servo amplifier 892–60 which is directly connected to accurately control the velocity and extent of movement of a reversible actuator 893–60. The power actuator 893–60 is comprised of the motor 75 which, in turn, is controlled by the operation of the servo valve 465, with the motor being connected to drive the pinion 388 which is meshingly engaged with the ring gear 386 that is secured to the table 60. The general arrangement for effecting movement of the table 60 about its own axis or the fifth axis of machine movement is similar to that utilized for effecting required movement of the table base 57 about the fourth axis 58.

As schematically represented in block diagram form in FIG. 14, the power actuator 893–60 is connected to drive an actuating mechanism 894–60 which, in turn, is directly connected to a load 895–60, in this case represented by the table 60. The actuating mechanism 894–60 is represented as comprising a transmission 391 and ring gear 386.

In like manner, the conductor 889–47 transmits information from the trunk line 888 to activate the error operator 890–47 for supplying velocity control information for rotating the spindle 47. The error operator 890–47 is operative to receive feed back information as to the velocity of the spindle 47 from a tachometer 901, shown in FIGS. 2 and 14, via the line 879–47, and which is connected to be driven by the motor 48 as it operates to rotate the spindle. The error operator 890–47 operates to produce voltage proportional to the magnitude of the error. The voltage ratios and binary numbers stored in the code converter 887 are compared to the corresponding voltages from the feed back conductors connected to the error operator 890–47 for controlling the rate of spindle drive.

From the error operator 890–47, command control information is transmitted to actuate the servo amplifier 892–47 which is connected to accurately control the velocity of a reversible power actuator 893–47. The power actuator 893–47 is comprised of the hydraulic motor 48 connected to be controlled by the operation of the servo valve 557, shown in FIG. 12, with the motor 48 being connected to rotate the spindle 47.

As schematically represented in block diagram form in FIG. 14, the power actuator 893–47 for the spindle 47, is connected to drive actuating mechanism 894–47 which, in turn, is directly connected to a load 895–47, in this case represented by the spindle 47. The rotary actuating mechanism 894–47 is represented as comprising a transmission 902 located within the spindle head 43, which is operative to drive the spindle 47 through an input gear 903 meshingly engaged with a spindle drive gear 904.

In like manner the conductor 889–32 transmits information from the trunk line 888 to activate the error operator 890–32 for supplying both positional and velocity control information for moving the column 32 along the "X" axis. The error operator 890–32 is operative to receive feed back information via lines 891–32 and 879–32, the lines being respectively connected to supply feed back information as to the position of the column 32 along the "X" axis and information as to the velocity of the column as it is being moved along the "X" axis. To provide accurate position feed back information, the line 891–32 is connected to a posiiton indicator or sensing head 905, shown in FIGS. 2 and 14, which is secured directly to the base 30. The sensing head 905 cooperates with a scale 906 which is secured directly to the under side of the lateral extension 37 on which the column 32 is supported for movement along the "X" axis. The scale 906 is energized by means of supply conductors [not shown]. Cooperative coaction between the sensing head 905 and the scale 906 provides an accurate feed back signal to indicate the position of the column along the base 30 as it is moved to a selected position along the "X" axis. The scale and sensing heads 905 and 906 are similar to the scales and sensing heads associated with the table base 57 and table 60 and are operative in the manner described to supply position feed back information to the error operator 890–32.

To supply feed back information as to the velocity of the column 32, as it is moved along the base 30, the line 879–32 is connected to receive information from a tachometer 907 which is mechanically connected to be driven by operation of the motor 34 as indicated in FIG. 2. The error operator 890–32 operates to produce voltage proportional to the magnitude of the error, as well as indicating the direction of position error. The voltages stored in the code convertor 887 are compared to the corresponding voltages from the feed back conductors connected to the error operator 890–32, with motion being stopped upon the occurrence of coincidence between the feed back supply and code converter information.

From the error operator 890–32, command control information is transmitted to actuate the servo amplifier 892–32 which is directly connected to accurately control the velocity and extent of movement of a reversible power actuator 893–32. The power actuator in this instance is comprised of the motor 34 which is operably controlled by operation of the servo valve 773. The motor 34 is directly connected to drive the column moving translating screw 908 which, in turn, is connected to be engaged by a nut 909 directly secured to the movable column 32.

As schematically represented in block diagram form in FIG. 14, the power actuator 893–32 is connected to drive the translating mechanism 894–32 which, in turn, is directly connected to a load 895–32, in this case represented by the column 32. Although, in this case, the translating mechanism 894–32 is represented as comprising a cooperating screw 908 and nut 909, any suitable equivalents may be utilized for these particular elements.

For the control of the spindle head, the conductor 889–43 transmits information from the trunk line 888 to activate the error operator 890–43 for supplying both positional and velocity control information for moving the spindle head 43 along the "Y" axis. The error operator 890–43 is operative to receive feed back information via lines 891–43 and 879–43, the lines being respectively connected to supply feed back information as to the position of the spindle head 43 along the "Y" axis and information as to the velocity of the spindle head as it is being moved along the "Y" axis. To provide accurate position feed back information, the line 891–43 is connected to a position indicator or sensing head 911 which is secured directly to the spindle head, as shown in FIG. 1. The sensing head 911 is carried for movement relative to a cooperating scale 912 which is secured directly to the column 32 and connected to be energized by means of supply conductors [not shown]. The cooperative coaction between the sensing head 911 and the scale 912 provides an accurate feed back signal to indicate the position of the spindle head along the column as it is moved to a selected position along the "Y" axis. The cooperating sensing head 911 and energizable scale 912 is similar to the sensing head 905 and scale 906 associated with the column, and operative to sense the position of the spindle head 43 and produce a voltage which is supplied as position feed back information to its associated error operator 890–43.

To provide feed back information as to the velocity of the spindle head 43, as it is moved along the column, a line 879–43 is connected to receive information from a tachometer 913 which is mechanically connected to be driven by the motor 44, as indicated in FIG. 2. The error operator 890–43 operates to produce voltage proportional to the magnitude of the error, as well as indicating the direction of the position error. The voltage ratios and binary numbers stored in the code converter 887 are compared to the corresponding voltages from the feed back conductors connected to the error operator 890–43, with motion being stopped upon the occurrence of coincidence between the feed back supply and the code converter information.

From the error operator 890–43, command control information is transmitted to actuate the servo amplifier 892–43 which is directly connected to accurately control the velocity and extent of movement of a reversible power actuator 893–43. The power actuator 893–43 is comprised of the reversible motor 44 which is operationally controlled by the servo valve 761, with the reversible hydraulic motor 44 being connected to drive a translating mechanism 894–43. The translating mechanism 894–43, in turn, is directly connected to a load 895–43, in this case represented by the spindle head 43. The translating mechanism 894–43 is represented by the screw 38 driven by the motor 44 and which is cooperatively engaged by a nut 914 that is secured to the spindle head 43, in well known manner.

Similarly, the conductor 889–56 in FIG. 14A, transmits information from the trunk line 888 to activate the error operator 890–56 for supplying both positional and velocity control information for moving the saddle 56 along the "Z" axis. The error operator 890–56 is operative to receive feed back information via lines 891–56 and 879–56, the lines being respectively connected to supply feed back information as to the position of the saddle 56 along the "Z" axis and information as to the velocity of the saddle as it is being moved along the base extension 31 in its path of travel. To provide accurate position feed back information, the line 891–56 is connected to a position indicator or sensing head 916 which is secured directly to the side of the base extension 31 as shown in FIG. 5. The sensing head 916 is positioned to cooperate with a scale 917 which is secured for movement with the saddle 56 and connected to be energized by means of supply conductors [not shown]. The cooperative coaction between the sensing head 916 and the scale 917 provides an accurate feed back signal to indicate the position of the saddle along the base extension 31 as it is moved to a selected position along the "Z" axis.

For providing feed back information as to the velocity of the saddle 56, the line 879–56 is connected to receive information from a tachometer 918 which is mechanically connected to be driven by the motor 64 as it operates to effect a translational movement of the saddle 56. The error operator 890–56 is also operative to produce voltages proportional to the magnitude of the error, as well as indicating the direction of the position error. The voltage ratios and binary numbers stored in the code converter 887 are compared to the corresponding voltages from the feed back conductors connected to the error operator 890–56, with motion being stopped upon the occurrence of coincidence between the feed back supply and the code converter information.

From the error operator 890–56, command control information is transmitted to actuate the servo amplifier 892–56 which is directly connected to accurately control the velocity and extent of movement of a reversible power actuator 893–56. The power actuator 893–56 is comprised of the reversible hydraulic motor 64 operatively controlled by the servo valve 785, with the motor being connected to drive the saddle translating screw 63. The translating screw 63, in turn, is connected to be engaged by the nut 65 directly secured to the movable saddle 56, as shown in FIG. 5 and previously described.

As shown in FIG. 14A, the power actuator 893–56, which is represented in block diagram form, is connected to drive a translating mechanism 894–56 which, in turn, is directly connected to a load 895–56, in this case represented by the saddle 56. The translating mechanism 894–56 is represented as comprising the cooperating screw 63 and nut 65.

It is to be noted that the tape input from the tape reader 885 is operative to effect both velocity and point-to-point positioning control of the movable members, including the column 32, the spindle head 43, the saddle 56, the table base 57, and the rotary work supporting table 60, along all five axes.

In addition to the command information available to these movable members, separate fixed reference signals are available to effect the required movement of the column 32, the spindle head 43, and the saddle 56, for positioning the tool spindle 47 in the tool change ready station, while moving the rotary work table 60 outwardly from the column so that a workpiece carried thereby will not interfere with a tool change operation.

Bodily positioning movement of the tool spindle 47 is effected in response to an appropriate signal from the tape reader 885, this signal being appropriately spaced upon the punched control tape in relation to the other command information initiating the various other machine movements or functions.

Whenever the tape reader 885 calls for a tool change, it is necessary as a prerequisite thereto to effect the required bodily positioning of the tool spindle into a tool change ready position. To this end an alternate positioning control is provided and is initiated prior to initiating a tool change cycle and is effected by closure of a contact 920, shown in line 56 of FIG. 13, in response to an appropriate signal from the tape reader, FIG. 14. Upon closure of the contact 920, FIG. 13, a circuit is completed from the energized conductor 835 along the line 56 through the now closed contact 920 to a coil of a relay 921 with the circuit being completed to the energized conductor 836.

Energization of the coil of the relay 921 effects actuation of associated normally closed contacts 921–32, 921–43, shown in FIG. 14, and 921–56, shown in FIG. 14A. As indicated in FIGS. 14 and 14A, the normally closed contacts 921–32, 921–43 and 921–56, when moved to open position, operate to interrupt the control from the associated error operators 890–32, 890–43 and 890–56, respectively. At the same time, normally open contacts 923–32, 923–43 and 923–56, associated with the relay 921, are moved to closed position to interconnect conductors from fixed manned reference voltages 925–32, 925–43 and 925–56, respectively, to positioning synchros 926–32, 926–43 and 926–56, respectively. The synchros are operatively connected to associated discriminator panels 927–32, 927–43 and 927–56, respectively. The discriminator panels, in turn, are now connected to the associated servo amplifiers through normally open contacts 928–32, 928–43 and 928–56, operatively associated with the relay 921 and which are now moved to the closed position, so that the respective discriminator panels 927–32, 927–43 and 927–56 are connected to control the operation of the servo amplifiers 892–32, 892–43 and 892–56, respectively. With this condition existing, the column drive motor 34, the spindle head drive motor 44, are operated so as to move the column 32 and spindle 43 for effecting the desired positioning of the spindle at the tool change ready station.

In a similar manner, the saddle motor 64 is operated to effect the required positioning of the saddle with respect to the column 32 to move the table 60 outwardly thereof so that a workpiece carried by the table will not interfere with the tools being interchanged in a tool changing operation.

For positioning the tool stroage magazine 82, a signal from the tape reader 885 is transmitted to the code converter 887 and thence via trunk line 888 and a conductor 931 to a switch coincident control circuit 932, as shown in FIG. 14A. From the coincident circuit 932, the circuit continues via a conductor 933 to actuate the hydraulic control valve 600 for operating the magazine drive motor 115 which is connected to rotate the tool storage magazine 82, as previously described. The hydraulic control valve, as shown in FIG. 14A, is connected to be energized by conductor 934 connected to the trunk line 897. Upon arrival of the next selected tool at the tool change ready station, the coded collar 119 is operative to actuate switching mechanism 118, the latter being connected via return conductor 936 to the switch coincidence circuit 932. Upon the occurrence of coincidence between the coded input signal from the tape reader 885 and a switch mechanism 118, the coincidence switch actuating circuit 932 is operative to actuate the control valve 600 for stopping the operation of the magazine motor 115. After the required bodily positioning movement of the column 32 along the "X" axis and the spindle head 43 along the "Y" axis, as well as the bodily positioning movement of the saddle 56 along the "Z" axis have been accomplished for effecting the required bodily positioning movement of the spindle 47, as well as for moving the workpiece carried by the rotating work table 60 away from the column, the tool change cycle may be initiated by tape controlled actuation of the contact 844, shown in line 13 of FIG. 13, in response to a tape command signal, as previously described.

Whenever the tape control selector switch 880, shown in FIG. 14, is actuated, conductors 881 and 882 are energized, as previously described. Also, the closing of the tape selector switch 880 operates to effect energization of branch conductors 937 and 938 respectively connected to be energized from the conductors 881 and 882. Thus, circuits are completed from the branch conductor 937 along horizontal conductors 938 to 942 inclusive to the solenoids 778, 776, 790, 829 and 811, with the circuits being completed to the now energized conductor 938. Thus, the valves 774, 762, 786 and 825 are all conditioned simultaneously to supply fluid pressure to the respective servo valves 773, 761, 785 and 465 so that the hydraulic motors associated with these servo valves may be operated to effect the desired movement of the related elements. In addition, the solenoid 811 associated with the valve 810 will condition the valve for supplying fluid pressure directly to the counterbalance mechanisms 491 and 492, as previously described. However, the solenoid 799 associated with the valve 795 that is connected to control the operation of the table base motor 70 and the solenoid 803 that is associated with the valve 804 connected to supply fluid pressure to the table base lock mechanisms 508 and 509 are energized from a command signal from the tape reader 885 which will actuate a normally open contact 943 to closed position. With the contact 943 closed, a circuit is established from the energized conductor 937 through the closed contact 943 and along a conductor 944 to the solenoid 799 with the circuit being completed to the energized conductor 938. Simultaneously therewith, a branch conductor 945 connected to the conductor 944 will conduct the flow of current to the solenoid 803 with the circuit being completed back to the energized conductor 938. Thus, the valves 795 and 804 are actuated simultaneously and only when commanded to do so from the signal obtained from the tape. It is therefore apparent that when the machine is being operated by tape control, the valves 774, 762, 786, 825, 810, 795 and 804 are also operated by the command signals from the tape.

Movement of the individual movable members of the machine may be initiated by manual actuation of a selector switch 877. To this end, the tape selector switch 880 is caused to be moved to its open condition, as shown in FIG. 14, while the manual selector switch 877 is actuated, thereby moving a pair of normally open contacts 947 to a closed position and effecting the movement of the normally closed contacts 883 and 884 associated therewith, to an open position. When the contacts 883 and 884 are moved to an open position they will operate to interrupt the energizing circuit to the tape reader 885, as well as to the conductor 899, thereby interrupting the tape control circuit to the various movable members previously described. With the normally open contact 947 closed, a circuit from the energized conductors 835 and 836 is established via branch conductors 948 and 949, the now closed contacts 947 to conductors 951 and 952. The conductor 951 is connected to energize a conductor 953 while the conductor 952 is connected to energize a conductor 954. The energized conductors 951 and 952 are also connected to energize the conductors 937 and 938 associated with the energizing circuit for the solenoids 778, 776, 790, 829, 811, 799 and 803, previously described.

For effecting selective pivotal movement of the table base 57, either upwardly or downwardly as desired, a directional selector switch 955 is manually positionable for effecting the desired energization of the servo valve 892–57 for operating the servo valve 325 to effect the operation of the motor 70 in a desired direction and thereby pivot the table base 57 in the desired direction. When the directional selector switch 955 is positioned, as shown, it operates to move a contact 956 thereof to closed position so that the servo amplifier 892–57 will be energized for effecting the operation of the motor 70 in a direction to effect the pivotal downward movement of the table base 57. On the other hand, if the manual directional selector switch 955 had been actuated to its other position to close its associated contact 957, the servo amplifier 892–57 would be conditioned for operation so that the motor 70 would be operated for effecting the pivotal movement of the table base 57 in an upwardly direction.

With the selector switch 955 positioned as shown in FIG. 14, a push button switch 958 is actuated. With the switch 958 actuated, a pair of normally closed contacts 959 are moved to open position for disconnecting the error operator 890–57 so that it can have no affect whatsoever on the servo amplifier. In addition, a normally open contact 960 is moved to closed position thereby completing the circuit for bypassing the normally open automatic contact 943 so that a circuit from the energized conductor 937 is established through the now closed contact 960 to both of the solenoids 799 and 803. With the solenoids 799 and 803 energized, the associated valves 795 and 804 respectively are conditioned to supply fluid pressure to the servo valve 325 associated with the motor 70 and to the table base lock mechanisms 508 and 509 to effect their release so that the motors may be operated to effect the pivotal movement of the table base 57. With the switch 958 depressed, another normally open contact 661 is moved to closed position for completing the circuit from the energized conductor 953 through the now closed contact 661 and through the closed contact 956 of the directional selector switch 955 to energize the servo amplifier 892–57, the circuit being completed to a common line 962 connected to the energized conductor 954. The line 962 serves as a common line for both manual and tape effected energization of the servo amplifier 892–57. This circuit operates to actuate the servo valve 325 so that the motor 70 is caused to operate in a direction to effect the pivotal downward movement of table base 57. Such movement will continue as long as the switch 958 is depressed. When the table base 57 has reached the desired position, the switch 958 will be released to interrupt the circuit to the servo amplifier 892–57 for stopping motor operation. Release of the switch 958 also causes its contact 960 to be moved to open position to interrupt the circuit to the solenoid 799 and solenoid 803 so that the table base lock mechanisms 508 and 509 are returned to lock the table base in the desired position.

The rotary table 60 may also be operated through the manual actuation of a switch 964 and in a desired direction through a directional selector switch 963 which, when manually actuated into the position shown in FIG. 14, wherein its contact 965 is moved to a closed position, will operate to effect the energization of the servo amplifier 892–60 for operating the servo valve 465 to effect the operation of the motor 75 in a direction for driving the rotary table 60 in a counterclockwise direction. On the other hand, should the directional selector switch 963 be operated so its contact 966 is moved to a closed position, the servo valve will be conditioned to effect the operation of the servo valve 465 to effect the operation of the motor 75 in a direction to drive the rotary table 60 in a clockwise direction. With the selector switch 963 positioned, as shown in FIG. 14, so that the servo amplifier is conditioned for counterclockwise rotation of the table 60, depressing the switch 964 will effect the opening of a pair of normally closed contacts 967 associated therewith to disconnect the error operator 890–60 from the servo amplifier 892–60. Also, actuation of the switch 964 will effect the closing of its normally open contact to complete a circuit from the energized conductor 953 through the now closed contact 968 and the closed contact 965 of the selector switch 963, to energize the servo amplifier 892–60, the circuit being completed through a common line 969 connected to the energized conductor 954. The line 969 is the common line for both manual and tape energization of the servo amplifier 892–60. The table 60 will continue to rotate in a counterclockwise direction until the switch 964 is released when the desired position is reached to open its contact 968 and thereby interrupt the circuit to the servo amplifier 892–60 to effect the stopping of the motor 75.

Spindle rotation may be initiated manually by depressing a switch 970 with the speed at which the spindle is rotated being controlled by setting a potentiometer 971. When the switch 970 is actuated, a pair of normally closed contacts 972 are moved to open position thereby disconnecting the error operator 890–47 from the servo amplifier 892–47. Actuation of the switch 970 will also operate to close its associated normally open contact 973 so that a circuit will be completed from the energized conductor 953 to the resistor of the potentiometer 971 and thence through its associated wiper arm and through the now closed contact 973 to the servo amplifier, with the circuit being completed back to the energized conductor 954 via a common line 974. The common line 974 also serves to complete the circuit for the servo amplifier whenever it is energized via the line 898 associated with automatic operation under tape control. When it is desired to stop spindle rotation, the switch 970 is released thereby opening its contact 973 to interrupt the circuit from the potentiometer to the servo amplifier 892–47 to stop the operation of the motor 48.

The column 32, the spindle head 43, and the saddle 56, may also be selectively energized through circuits similar to that described for the manually initiated actuation of the table base 57. Thus, a directional selector switch 975 may be actuated to move an associated contact 976 to closed position for energizing the servo amplifier 892–32 to effect the movement of the column 32 in a rightward direction. On the other hand, if the selector switch 975 is actuated to an upward position, wherein its associated contact 977 is moved to a closed position, the servo amplifier 892–32 will be energized to effect column movement in a leftward direction. Assuming that the selector switch 975 is positioned as shown, depressing a switch 978 will operate to move a pair of associated normally closed contacts 979 to open position to disconnect the error operator 890–32 from the servo amplifier 892–32. In addition a normally open contact 980 associated with the switch 978 is moved to closed position. With the contact 980 in closed position, a circuit is completed from the energized conductor 953, through the now closed contact 980, and through the closed contact 976 of the selector switch 975 to the servo amplifier 892–32. The circuit is completed from the servo amplifier 892–32 to the energized conductor 954 via a common line 981. Movement of the column 32 in the selected direction will continue until such time as the switch 978 is released for opening its contact 980 to interrupt the circuit to the servo amplifier 892–32.

In a similar manner, the spindle head 43 may be caused to move either upwardly or downwardly as desired by manually positioning a selector switch 983, which when moved to the position shown, operates to move an associated contact 984 to a closed position so that the servo amplifier 892–43 will be energized for effecting the operation of the motor 44 to move the spindle head 43 downwardly. On the other hand, should the selector switch 983 be manually moved to its other position, wherein its contact 985 is moved to closed position, the servo amplifier will be energized to effect the operation of the motor 44 in a direction to move the spindle head 43 upwardly. With the selector switch 983 positioned as shown, and with the start switch 986 depressed, a pair of normally closed contacts 987 are moved to open position to disconnect the error operator 890–43 from the servo amplifier 892–43. The switch 986, when actuated, will also operate to close its associated normally open contact 988 for completing a circuit from the energized conductor 953 through the now closed contact 988 and through the closed contact 984 of the selector switch 983 to the servo amplifier 892–43, with the circuit being completed through a common line 989 to the energized conductor 954. Movement of the spindle head in the selected direction will continue until such time as the switch 986 is released for returning its contact 988 to its open position to interrupt the circuit to the servo amplifier to stop the operation of the motor 44.

In a similar manner movement of the saddle 56 is manually initiated in a direction established by a directional selector switch 991. With the selector switch 991 positioned as shown in FIG. 14A, associated contact 992 is moved to closed position so that the servo amplifier 892–56 will be energized for effecting the operation of the saddle motor 64 in a direction to cause the saddle 56 to be moved outwardly away from the column 32. On the other hand, should the selector switch 991 be moved to its other position, wherein a contact 993 is moved to a closed position, the servo amplifier 892–56 will be conditioned for effecting the operation of the motor 64 in the opposite direction whereby the saddle 56 is caused to move inwardly towards the column 32. With the selector switch 991 positioned as shown, and with the start switch 994 depressed, a pair of normally closed contacts 995 are moved to open position to disconnect the error operator 890–56 from the servo amplifier 892–56. Also, a normally open contact 996 is moved to closed position to complete a circuit from the energized conductor 953 through the now closed contact 996 and thence through the closed contact 992 of the directional selector switch 991, to energize the servo amplifier 892–56, with the circuit being completed via a common line 997 to the energized conductor 954. Outward movement of the saddle 56 will continue until the switch 994 is released, so that its contact 996 is returned to open position for interrupting the circuit to the servo amplifier 892–56 and stopping the operation of the motor 64.

From the foregoing detailed explanation of the operation of the machine tool herein set forth as a practical embodiment of the present invention, it will appear that there has been provided a greatly improved automatic machine having five axes of member movement and having a tool change mechanism that is automatically operated to interchange preselected tools with the tool spindle, the machine being particularly well adapted for operation from recorded information.

Although the illustrative embodiment of the invention has been described in considerable detail for the purpose of fully disclosing a practical operative structure by means of which the invention may be practiced, it is to be understood that the particular apparatus and control system herein described are intended to be illustrative only and that the various novel characteristics of the invention may be incorporated in other structural forms without departing from the spirit and scope of the invention as defined in the sub-joined claims.

The principles of this invention having now been fully explained in connection with the foregoing description, we hereby claim as our invention:

1. In a machine tool having a base presenting a supporting guideway;
   a column mounted on the supporting guideway of said base for movement therealong;
   a vertical supporting guideway on said column;
   a power driven rotatable tool carrying spindle mounted on said vertical guideway for movement therealong, said tool carrying spindle being disposed with its axis of rotation transverse to the path of travel of said column;
   a second base extending from the side of said first base in a direction parallel to the axis of rotation of said spindle;
   a saddle supported on said second base for movement in a direction parallel to the axis about which said spindle rotates;
   a table base carried by said saddle for movement with it and for independent pivotal movement relative to the saddle, said table being pivotally movable about an axis which is transverse to the axis of spindle rotation;
   a rotary table having a work supporting surface carried by said table base for pivotal movement with said table base and for independent rotation relative to said table base about its own axis; and,
   separate power means operably connected to actuate the movable members in their respective paths of travel;
   whereby the position of said table and said spindle may be varied relative to each other in five different planes to establish a desired working relationship between a tool carried by said spindle and the work supporting surface of said table.

2. In a machine tool having a base;
   a column mounted on said base for movement therealong;
   a power driven rotatable tool carrying spindle carried by said column for vertical movement and having its axis of rotation disposed transverse to direction in which said column is movable;
   a saddle carried by the base for movement in a rectilinear path of travel parallel to the axis about which said spindle rotates;
   a table supporting base carried by said saddle for bodily pivotal movement in an arcuate path about an axis that is transverse to the axis of said spindle;
   a work supporting table carried by said table base for bodily pivotal movement with said table base and for independent rotation about its own axis;
   a segmental gear rack secured to each side of said table base;
   a pair of gear trains carried by said saddle with each being operably engaged with one of said segmental gear racks;

power means carried by said saddle and operably connected to drive both of said gear trains simultaneously;

releasable clamping mechanisms carried by the saddle in positions to engage said table supporting base and normally acting to apply a clamping force for holding said table base in any angular position; and, a source of power connected to selectively actuate said clamping mechanisms in a releasing action.

3. In a machine tool having a base;

a power driven rotatable tool carrying spindle carried by the base for movement in two mutually transverse directions, said spindle having its axis of rotation disposed in a horizontal plane transverse to the directions in which it is movable;

a saddle carried by the base;

means for mounting said saddle on the base for rectilinear movement along a path of travel that is parallel to the axis about which said spindle rotates;

a work supporting table carried by said saddle for rotation about its own axis and for bodily pivotal movement in an arcuate path about an axis which is transverse to its axis of rotation and the axis of said spindle;

a pair of segmental gear racks operably connected to said table;

gearing carried by said saddle and meshingly engaging said gear racks;

power means carried by said saddle and operably connected to drive said gearing simultaneously for effecting the pivotal movement of said table in either direction;

a pair of hydraulic actuator means pivotally carried by said saddle and pivotally connected to said table to counterbalance the weight of said table as it is pivotally moved in an arcuate path of travel; and, a pair of power operated clamping means carried by said saddle and operably connected to act on said gear racks to selectively clamp said table in any angular position to which it may be pivotally moved.

4. In a machine tool having a base;

a tool carrying spindle rotatably supported by the base and having an axis of rotation disposed in a horizontal plane;

means for mounting said spindle on the base for movement in two mutually transverse directions both of which are also transverse to the axis about which said spindle rotates;

a saddle carried by the base;

means for mounting said saddle on the base for rectilinear movement along a path of travel parallel to the axis about which said spindle is rotatable;

a pair of axially aligned pivot shafts carried by said saddle in spaced relationship, the axes of said pivot shafts being disposed in a plane transverse to the axis about which said spindle rotates;

a table base journaled on said pivot shafts for independent bodily pivotal movement in an arcuate path of travel relative to said saddle and for rectilinear movement with said saddle;

a pair of gear sectors secured to said table base;

a pair of gear drives carried by said saddle with each being connected to one of said gear sectors and operable simultaneously for effecting the bodily pivotal movement of said table base;

a work supporting table mounted on said table base for bodily movement with said table base and connected to be rotated by power about its own axis relative to said table base;

a pair of hydraulic counterbalance mechanisms pivotally carried by said saddle and pivotally connected to said table base to counterbalance the weight of said table base and the components carried thereon to facilitate its pivotal movement;

a pair of clamping mechanisms carried by said saddle and operable selectively to engage said table base gear sectors for applying a clamping force to hold said table base in the angular position to which it is moved;

individual power means connected to effect the operation of the several movable members in their respective paths of travel;

a source of control signals; and, control means responsive to said signals for controlling the operation of said power means in accordance with a prescribed program of movements.

5. In a machine tool having a base presenting a supporting guideway;

a column mounted on the supporting guideway of the base for movement therealong;

a vertical supporting guideway on said column;

a power driven rotatable tool carrying spindle mounted on said column guideway for movement therealong, said spindle being disposed with its axis of rotation transverse to the path of travel of said column;

a second base extending transversely of the column supporting base and having a horizontal supporting guideway extending in a direction parallel to the axis of rotation of said spindle;

a saddle supported on the guideway of said second base for movement in a direction parallel to the axis of rotation of said spindle;

a table base carried by said saddle for movement with it and for independent pivotal movement relative to said saddle about an axis which is transverse to the axis about which said spindle rotates and to the path of travel of said saddle;

a rotary table having a work supporting surface carried by said table base for movement with said table base as the table base moves with said saddle and for pivotal movement with said table base as the table base is pivoted independently relative to said saddle, said rotary table being supported on the table base for independent rotation about its own axis relative to said table base;

a segmental gear rack secured to each side of said table base;

a pair of gear trains carried by said saddle with each being operably engaged with respective ones of said gear racks;

a single power means to drive said pair of gear trains;

means connecting said single power means for actuating said table base in its pivotal movement with both of said gear trains in a manner that said single power means will drive both said gear trains simultaneously;

a pair of table base counterbalance mechanisms carried by said saddle on either side of said table base and operably connected to counterbalance a substantial portion of the weight of said table base and components carried thereon as it is pivotally moved in its arcuate path of travel, each of said counterbalance mechanisms comprising a cylinder pivotally secured to said saddle;

a piston reciprocally supported within said cylinder and having a piston rod, said piston rod having its free end pivotally connected to said table base, the arrangement being such that the pivotal connection of said cylinders to said saddle and the pivotal connection of the free ends of the associated piston rods permits each of said counterbalance mechanisms to adjust themselves for any angular position to which said table base may be moved;

a pair of clamp mechanisms carried by said saddle and disposed in position to act on said gear racks to normally apply a clamping force to said gear racks to clamp said table base in any angular position; and, fluid means operably connected to operate said clamp mechanisms simultaneously in a releasing operation.

(References on following page)

References Cited by the Examiner

UNITED STATES PATENTS

| | | | |
|---|---|---|---|
| 1,121,991 | 12/1914 | Durkee | 77—36 X |
| 1,925,025 | 8/1933 | Amann | 90—13 X |
| 2,059,753 | 11/1936 | Scott | 90—56 |
| 2,146,906 | 2/1939 | Moller | 77—5 |
| 2,787,197 | 4/1957 | Gordon. | |
| 2,820,187 | 1/1958 | Parsons. | |
| 2,911,662 | 11/1959 | Sedgwick. | |
| 2,939,367 | 6/1960 | Thomas. | |
| 3,052,011 | 9/1962 | Brainard. | |
| 3,054,333 | 9/1962 | Brainard | 90—56 |
| 3,077,128 | 2/1963 | Brown | 77—5 |
| 3,125,796 | 3/1964 | Brainard | 29—26 |

OTHER REFERENCES

Giddings and Lewis Machine Tool Co., catalog SKM-4, received Sept. 19, 1960.

134,957, January 1961, Fridman (Russian author's certificate).

WILLIAM W. DYER, JR., *Primary Examiner.*

RICHARD H. EANES, LEON PEAR, *Examiners.*